United States Patent
Muramatsu et al.

(10) Patent No.: US 12,070,925 B2
(45) Date of Patent: Aug. 27, 2024

(54) FIXING ROTATING MEMBER, FIXING APPARATUS AND ELECTROPHOTOGRAPHIC IMAGE FORMING APPARATUS, AND METHOD FOR PRODUCING FIXING ROTATING MEMBER

(71) Applicant: CANON KABUSHIKI KAISHA, Tokyo (JP)

(72) Inventors: Hiroki Muramatsu, Tokyo (JP); Ryo Ishifuji, Ibaraki (JP); Yohei Miyauchi, Tokyo (JP); Yasuharu Notoya, Tokyo (JP); Yusuke Baba, Kanagawa (JP); Masaaki Takahashi, Kanagawa (JP); Naoko Kasai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 17/554,192

(22) Filed: Dec. 17, 2021

(65) Prior Publication Data
US 2022/0206419 A1 Jun. 30, 2022

(30) Foreign Application Priority Data

Dec. 25, 2020 (JP) .................. 2020-217922
Nov. 16, 2021 (JP) .................. 2021-186416

(51) Int. Cl.
*B32B 27/28* (2006.01)
*B32B 1/08* (2006.01)
(Continued)

(52) U.S. Cl.
CPC .............. *B32B 27/285* (2013.01); *B32B 1/08* (2013.01); *B32B 27/304* (2013.01); *B32B 33/00* (2013.01);
(Continued)

(58) Field of Classification Search
CPC .... G03G 15/2057; B32B 1/08; B32B 27/285; B32B 27/304; B32B 33/00;
(Continued)

(56) References Cited

U.S. PATENT DOCUMENTS 9,164,450 B2   10/2015   Matsumoto et al.
10,379,464 B2   8/2019   Muramatsu et al.
(Continued)

FOREIGN PATENT DOCUMENTS

EP    3770688 A1 *  1/2021  ............... B32B 1/08
JP    2-187436 A     7/1990
(Continued)

OTHER PUBLICATIONS

Machine translation of detailed description of JP2010-143118 acquired on Jan. 13, 2024.*

(Continued)

*Primary Examiner* — Gerard Higgins
(74) *Attorney, Agent, or Firm* — Venable LLP

(57) ABSTRACT

Provided is a fixing rotating member capable of maintaining high toner releasability over longer periods of time than in conventional instances and that is capable of maintaining abrasion resistance against paper; the fixing rotating member comprises a base layer, an elastic layer, and a surface layer, in this order; the surface layer containing a tetrafluoroethylene-perfluoroalkyl vinyl ether copolymer and a perfluoropolyether; the tetrafluoroethylene-perfluoroalkyl vinyl ether copolymer having pores formed therein; the surface layer has pores with openings at a first surface thereof, and constituting an outer surface of the fixing rotating member; at least part of the pores containing the perfluoropolyether; a content of the perfluoropolyether in the surface layer is 20 mass % to 60 mass %; and a degree of orientation A of molecules of the tetrafluoroethylene-perfluoroalkyl vinyl (Continued)

ether in a direction perpendicular to a circumferential direction of the surface layer is 35 to 75%.

16 Claims, 4 Drawing Sheets

(51) Int. Cl.
  *B32B 27/30* (2006.01)
  *B32B 33/00* (2006.01)
  *G03G 15/20* (2006.01)
(52) U.S. Cl.
  CPC ...... *G03G 15/2057* (2013.01); *B32B 2260/02* (2013.01); *B32B 2260/046* (2013.01); *B32B 2307/514* (2013.01); *B32B 2433/00* (2013.01)
(58) Field of Classification Search
  CPC .......... B32B 2260/02; B32B 2260/046; B32B 2307/514; B32B 2433/00
  See application file for complete search history.

(56) References Cited

U.S. PATENT DOCUMENTS

| | | |
|---|---|---|
| 10,739,712 B2 | 8/2020 | Miyauchi et al. |
| 10,901,354 B2 | 1/2021 | Notoya et al. |
| 10,983,466 B2 | 4/2021 | Miyauchi et al. |
| 11,137,707 B2 | 10/2021 | Asaka et al. |
| 11,181,856 B2 | 11/2021 | Miyauchi et al. |
| 2018/0043656 A1 | 2/2018 | Song et al. |
| 2020/0086282 A1 | 3/2020 | Tezuka et al. |
| 2020/0086283 A1 | 3/2020 | Tezuka et al. |
| 2020/0354533 A1 | 11/2020 | Tuszynski et al. |
| 2021/0003953 A1 | 1/2021 | Miyauchi et al. |
| 2021/0134534 A1 | 5/2021 | Toshinari |

FOREIGN PATENT DOCUMENTS

| | | |
|---|---|---|
| JP | 5-269944 A | 10/1993 |
| JP | 7-242768 A | 9/1995 |
| JP | 9-255807 A | 9/1997 |
| JP | 11-227143 A | 8/1999 |
| JP | 2006-305937 A | 11/2006 |
| JP | 2010-143118 A | 7/2010 |
| JP | 2018022056 A | 2/2018 |
| JP | 2018-180488 A | 11/2018 |
| JP | 2019-192749 A | 10/2019 |
| JP | 2020-007678 A | 1/2020 |
| JP | 2020-140185 A | 9/2020 |
| WO | 90/08218 A1 | 7/1990 |
| WO | 2018/116517 A1 | 6/2018 |
| WO | 2019/181796 A1 | 9/2019 |
| WO | 2022/138491 A1 | 6/2022 |

OTHER PUBLICATIONS

"Krytox", acquired from https://cdn.shopify.com/s/files/1/0270/6758/0483/files/Krytox_GPL_Typical_Properties-TMC.pdf?v=1597330049 (Year: 2015).*
Jui-Cheng Yen et al., "A New Criterion for Automatic Multilevel Thresholding," 4(3) IEEE T. Image Process. 370-378 (Mar. 1995).
Nobuyuki Otsu, "A Threshold Selection Method from Gray-Level Histograms," SMC-9, No. 1 IEEE T. Syst. Man. Cyb. 62-66 (Jan. 1979).
Y. Kitazaki et al., "Extended Fowkes' Equation and Evaluation of Surface Tension of Polymer Solid," 8(3) J. Adhes. Soc. Jpn. 131-141 (1972).
International Search Report in International Application No. PCT/JP2021/046737 (Mar. 2022).
Written Opinion in International Application No. PCT/JP2021/046737 (Mar. 2022).
U.S. Appl. No. 18/336,150 filed Jun. 16, 2023, Baba et al.
U.S. Appl. No. 17/554,211 filed Dec. 17, 2021, Kasai et al.
U.S. Appl. No. 17/554,231 filed Dec. 17, 2021, Miyauchi et al.
WO 2019/181796 JP 2020-140185, U.S. Pat. Nos. 10,739,712 B2, 10,901,354 B2, 10,983,466 B2, 2021/0003953 A1, U.S. Pat. No. 11,181,856 B2.
WO 2018/116517, 2020/0086282 A1 2020/0086283 A1.
JP 2019-192749, 2021/0134534 A1.

* cited by examiner

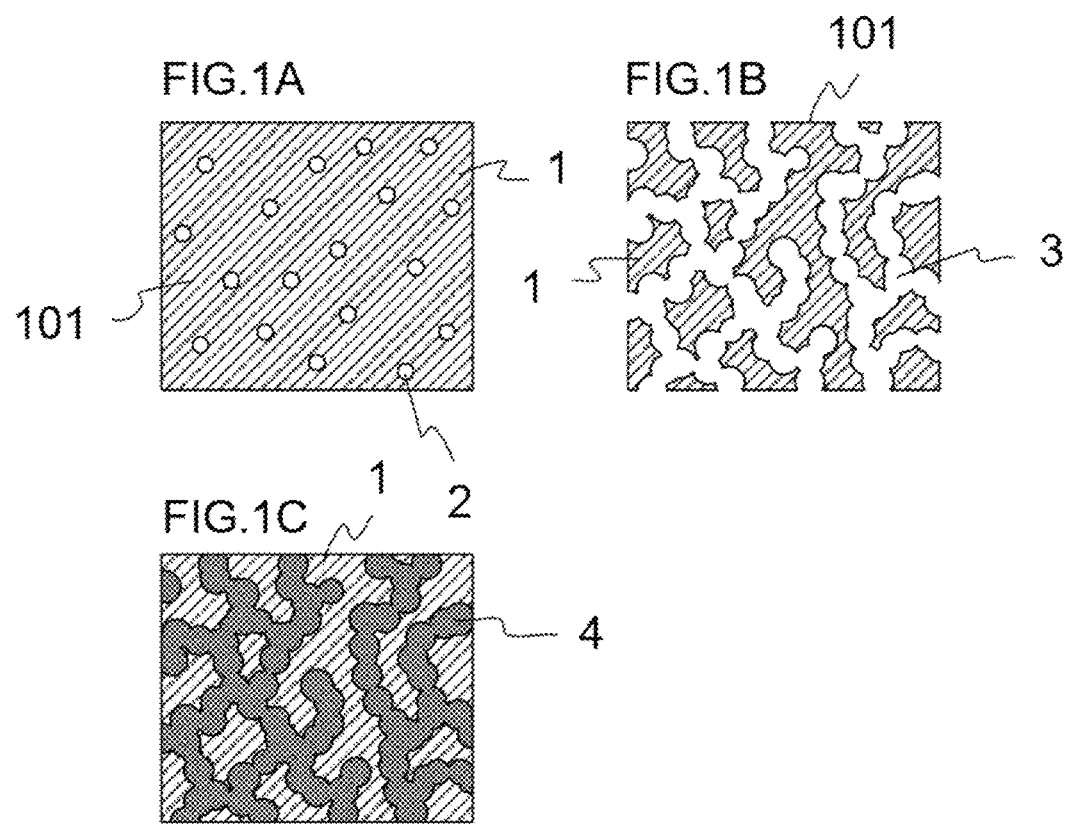
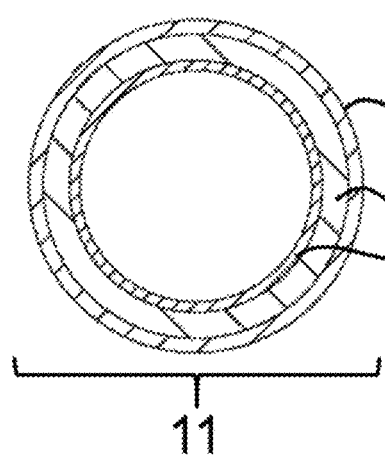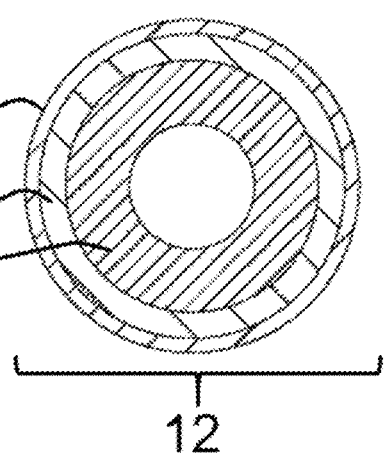

FIXING ROTATING MEMBER, FIXING APPARATUS AND ELECTROPHOTOGRAPHIC IMAGE FORMING APPARATUS, AND METHOD FOR PRODUCING FIXING ROTATING MEMBER

BACKGROUND OF THE INVENTION

Field of the Invention

The present disclosure relates to a fixing rotating member, to a fixing apparatus, to an electrophotographic image forming apparatus, and to a method for producing a fixing rotating member.

Description of the Related Art

In a fixing apparatus utilized in an electrophotographic image forming apparatus (hereafter also referred to as "image forming apparatus") such as a copier or a laser printer, rotating members in the form of a pair of heated rollers, a film and a roller, a belt and a roller, or a belt and a belt, are in pressure contact against each other. A recording medium such as paper, holding thereon an image formed by unfixed toner, is introduced into a pressure-contact portion (hereafter referred to as "fixing nip portion") formed between the rotating members, and the unfixed toner is melted through heating, to fix an image on the recording medium. The fixing rotating member with which the unfixed toner image on the recording medium comes into contact may be referred to as a fixing roller, a fixing film or a fixing belt, depending on the form in which the member is embodied.

Paper media used for forming electrophotographic images have become growingly diverse in recent years, and for instance there is a demand for accommodating thin paper, for instance paper having a basis weight of 52 $g/m^2$. In a conventional fixing member such as a fixing rotating member, however, molten toner at the time of heat fixing might in some instances adhere to the surface of the fixing rotating member, as a result the thin paper wraps around the fixing rotating member, on account of the low rigidity of such thin paper. In order to stably form electrophotographic images on thin paper it is thus necessary to impart higher toner releasability to the surface of the fixing rotating member. WO 2019/181796 discloses a fixing member whose a surface layer contains a fluororesin and a perfluoropolyether (hereafter also referred to as "PFPE"), such that the fixing member can maintain high toner releasability over long periods of time.

Studies by the inventors reveal that the fixing member according to WO 2019/181796 exhibits excellent toner releasability over long periods of time. However, WO 2019/181796 (paragraph 0018) indicates that fluorine oil is present, without phase separation from the fluororesin, in the surface layer of the disclosed fixing member. In such a case there is a limit to the amount of fluorine oil that can be incorporated into the surface layer. It was therefore found that in order to impart excellent toner releasability over longer periods of time to the fixing rotating member, a technique needs to be developed that aims at providing a fixing rotating member capable of holding a larger amount of PFPE and the PFPE can be supplied stably to the outer surface of the fixing rotating member.

SUMMARY OF THE INVENTION

At least one of aspects of the present disclosure is directed to providing a fixing rotating member capable of maintaining high toner releasability and abrasion resistance against paper over longer periods of time.

Another aspect of the present disclosure is directed to providing a fixing apparatus and an electrophotographic image forming apparatus that contribute to long-term stable formation of high-quality electrophotographic images.

Yet another aspect of the present disclosure is directed to providing a method for producing a fixing rotating member that allows maintaining high toner releasability and abrasion resistance against paper over longer periods of time.

According to one aspect of the present disclosure, there is provided a fixing rotating member comprising a base layer, an elastic layer, and a surface layer, in this order, the surface layer containing a tetrafluoroethylene-perfluoroalkyl vinyl ether copolymer and a perfluoropolyether;

the surface layer having pores with openings at a first surface thereof, and constituting an outer surface of the fixing rotating member;

at least part of the pores containing the perfluoropolyether, wherein a content of the perfluoropolyether in the surface layer is 20 to 60 mass %, and a degree of orientation A of molecules of the tetrafluoroethylene-perfluoroalkyl vinyl ether in a direction perpendicular to a circumferential direction of the surface layer is 35 to 75%.

According to another aspect of the present disclosure, there is provided a fixing apparatus, comprising a fixing rotating member, and heater for heating the fixing rotating member, wherein the fixing rotating member comprises a base layer, an elastic layer and a surface layer, in this order, the surface layer contains a tetrafluoroethylene-perfluoroalkyl vinyl ether copolymer and a perfluoropolyether, the surface layer has pores with openings at a first surface thereof, and constituting an outer surface of the fixing rotating member, at least part of the pores contains the perfluoropolyether, a content of the perfluoropolyether in the surface layer is 20 to 60 mass %; and a degree of orientation A of molecules of the tetrafluoroethylene-perfluoroalkyl vinyl ether in a direction perpendicular to a circumferential direction of the surface layer is 35 to 75%.

According to yet another aspect of the present disclosure, there is provided an electrophotographic image forming apparatus comprising a fixing apparatus, wherein the fixing apparatus comprises a fixing rotating member, and heater for heating the fixing rotating member, the fixing rotating member comprises a base layer, an elastic layer, and a surface layer, in this order, the surface layer contains a tetrafluoroethylene-perfluoroalkyl vinyl ether copolymer and a perfluoropolyether, the surface layer has pores with openings at a first surface thereof, and constituting an outer surface of the fixing rotating member, at least part of the pores contains the perfluoropolyether, a content of the perfluoropolyether in the surface layer is 20 to 60 mass %, and a degree of orientation A of molecules of the tetrafluoroethylene-perfluoroalkyl vinyl ether in a direction perpendicular to a circumferential direction of the surface layer is 35 to 75%.

According to still another aspect of the present disclosure, there is provided a method for producing a fixing rotating member, wherein the fixing rotating member comprises a base layer, an elastic layer, and a surface layer, in this order, the surface layer contains a tetrafluoroethylene-perfluoroalkyl vinyl ether copolymer and a perfluoropolyether, the surface layer has pores with openings at a first surface thereof, and constituting an outer surface of the fixing rotating member;

at least part of the pores contains the perfluoropolyether, a content of the perfluoropolyether in the surface layer is 20 to 60 mass %, and a degree of orientation A of molecules of the tetrafluoroethylene-perfluoroalkyl vinyl ether in a direction perpendicular to a circumferential direction of the surface layer being 35 to 75%, the method comprises the steps of:
(i) providing a resin tube comprising a tetrafluoroethylene-perfluoroalkyl vinyl ether copolymer, wherein
a degree of orientation A of molecules of the tetrafluoroethylene-perfluoroalkyl vinyl ether copolymer is 35 to 75%;
(ii) providing a layered body comprising
a base layer having an endless belt shape or a roller shape,
an elastic layer on an outer peripheral surface of the base layer, and
the resin tube on an outer peripheral surface of the elastic layer;
(iii) immersing the layered body in a first perfluoropolyether at a temperature from 25° C. to below Tp, where Tp (° C.) is a melting point of the tetrafluoroethylene-perfluoroalkyl vinyl ether copolymer, to impregnate the resin tube with the perfluoropolyether;
(iv) removing, with a solvent, at least part of the perfluoropolyether within the resin tube of the layered body obtained in step (iii), to form, in the resin tube, pores with openings in an outer peripheral surface of the resin tube; and
(v) incorporating a second perfluoropolyether into at least part of the pores, to obtain a fixing rotating member having a surface layer comprising the second perfluoropolyether in at least part of the pores.

Further features of the present disclosure will become apparent from the following description of exemplary embodiments with reference to the attached drawings.

BRIEF DESCRIPTION OF THE DRAWINGS

FIGS. 1A to 1C are respectively a surface observation image (A) of a resin layer of a fixing rotating member according to Example 1, a cross-sectional image (B) of the resin layer, and a cross-sectional image (C) of a surface layer, upon observation of a cross section along a belt circumferential direction;

FIGS. 2A and 2B are respectively a cross-sectional schematic diagram of a fixing belt (A) and a fixing roller (B);

DESCRIPTION OF THE EMBODIMENTS

Figure 3:
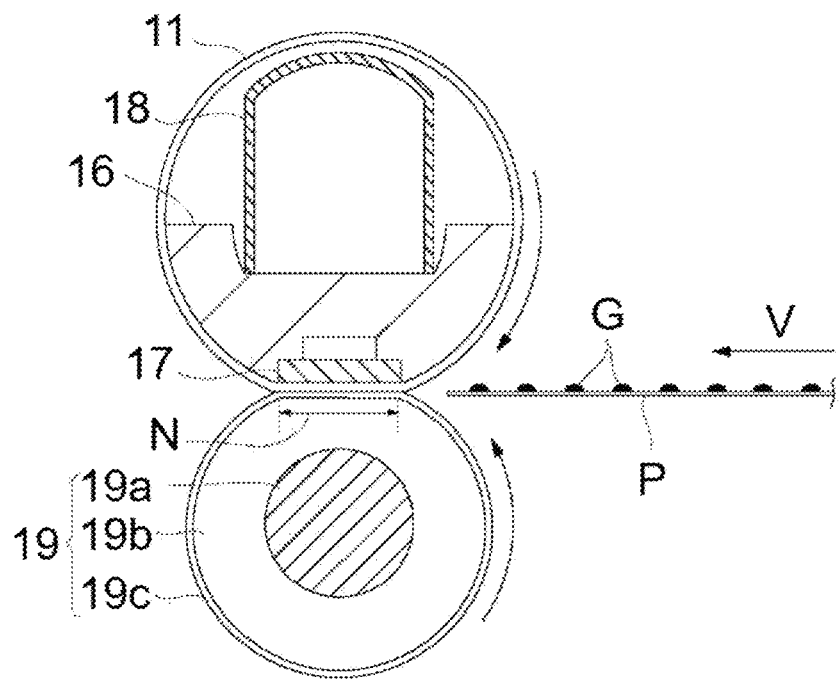
FIG. 3 is a cross-sectional schematic diagram of a fixing apparatus that utilizes a fixing belt.

In the present disclosure, the expression of "from XX to YY" or "XX to YY" indicating a numerical range means a numerical range including a lower limit and an upper limit which are end points, unless otherwise specified. When numerical value ranges are provided in stages, the upper limits and lower limits of the respective numerical values can be combined in any combination.

The inventors conducted repeated studies on fixing rotating members capable of maintaining superior toner releasability and abrasion resistance even upon prolonged use. As a result, the inventors found that a feature wherein a surface layer contains a tetrafluoroethylene-perfluoroalkyl vinyl ether copolymer (PFA); a feature wherein the surface layer has pores having openings in a first surface that constitutes the outer surface of a fixing rotating member, at least part of the pores contains a perfluoropolyether; a feature wherein the content of the perfluoropolyether in the surface layer is 20 to 60 mass %; and a feature wherein a degree of orientation A of PFA molecules within the surface layer, in a direction (hereafter also referred to as "MD", abbreviation for "Machine Direction") perpendicular to the circumferential direction (hereafter also referred to as "TD", abbreviation for "Transverse Direction") of the fixing rotating member, is 35 to 75%, all contribute to achieving the above goal.

Since the surface layer has pores, the surface layer can contain PFPE in the pores. As a result, a greater amount of PFPE can be held in the surface layer of the above fixing rotating member than in the surface layer disclosed in WO 2019/181796 in which PFPE is held within a fluororesin in a state without phase separation.

The openings of pores are at the first surface of the surface layer, which constitutes an outer surface of the fixing rotating member, and hence the PFPE within the pores can be caused to migrate to the first surface.

Further, the degree of orientation A of the PFA molecules in the surface layer, in the MD of the fixing rotating member, is 35 to 75%. That is, abrasion of the first surface of the surface layer and tearing of the surface layer in the TD can be suppressed more reliably through optimization of the orientation of the PFA molecules in the MD. As a result, disappearance of the openings of the first surface of the surface layer due to abrasion can be suppressed, and PFPE present in voids can migrate to the first surface more stably. It becomes also possible to prevent the PFPE present in the voids from leaking to the first surface on account of tearing of the surface layer.

As a result, it is deemed that the fixing rotating member according to the present aspect can maintain superior toner releasability, over longer periods of time, as compared with the fixing member of WO 2019/181796.

The fixing rotating member will be described in detail below.

1. Fixing Rotating Member

The fixing rotating member is for instance a fixing roller, a fixing film, a fixing belt or the like. The fixing rotating member has a base layer, an elastic layer and a surface layer, in this order.

FIG. 2A and FIG. 2B are cross-sectional diagrams illustrating different forms of fixing rotating members. FIG. 2A illustrates a fixing rotating member having an endless belt shape (hereafter also referred to as "fixing belt 11"), and FIG. 2B illustrates a fixing rotating member having a roller shape (hereafter also referred to as "fixing roller 12").

The fixing rotating members in FIG. 2A and FIG. 2B each have a base layer 13, an elastic layer 14 that covers the outer surface of the base layer 13, and a surface layer 15 that covers the surface, of the elastic layer, on the reverse side from that of the face opposing the base layer. The surface layer 15 may be bonded, by way of an adhesive not shown, to the surface of the elastic layer 14 on the reverse side from that opposing the base layer.

(1) Base Layer

A known material used as a base layer of fixing members such as fixing rotating members can be utilized, without particular limitations, as the material of the base layer 13. For instance, a metal or alloy such as aluminum, iron, stainless steel or nickel, or a heat-resistant resin such as polyimide, is used herein.

A base material having an endless belt shape may be used as the base layer 13 in the fixing belt 11. Examples of the material of the base layer 13 in this case include materials exhibiting excellent heat resistance, such as nickel, stainless steel and polyimide. The thickness of the base layer 13 is not particularly limited, but is preferably from 20 µm to 100 µm, for instance from the viewpoint of strength, flexibility and heat capacity.

For instance a solid or hollow core metal is used as the base layer 13 in the fixing roller 12. Examples of the material of the core metal include metals and alloys such as aluminum, iron and stainless steel. In a case where a hollow core metal is used, a heat source can be provided in the interior thereof.

The outer surface of the base layer 13 may be subjected to a surface treatment in order to impart adhesiveness towards the elastic layer 14. The surface treatment that is resorted to may be a physical treatment such as blasting, lapping or polishing, or a chemical treatment such as an oxidation treatment, a coupling agent treatment or a primer treatment, singly or in the form of a combination of a plurality of treatments.

In a case where an elastic layer 14 containing silicone rubber is provided on the surface of the base layer 13, it is preferable to perform a primer treatment on the surface of the base layer 13, in order to improve adhesiveness between the base layer 13 and the elastic layer 14.

Examples of primers used in primer treatments include coating materials in which a silane coupling agent, a silicone polymer, a hydrogenated methylsiloxane, an alkoxysilane, a reaction promoting catalyst and/or a colorant such as red iron oxide, are mixed and dispersed as appropriate in an organic solvent.

The primer can be selected as appropriate depending on the material of the base layer 13, the type of the elastic layer 14, and the form of crosslinking reactions. A primer containing hydrosilyl groups is preferably used in a case in particular where the elastic layer 14 contains a large amount of unsaturated aliphatic groups, in order to impart adhesiveness derived from a reaction with the unsaturated aliphatic groups. A primer containing unsaturated aliphatic groups is preferably used in a case where the elastic layer 14 contains a large amount of hydrosilyl groups, Other primers include primers containing alkoxy groups. A commercially available product can be used as the primer. The primer treatment includes a step of applying the primer onto the outer surface of the base layer 13 (surface bonded to the elastic layer 14), with drying or baking.

(2) Elastic Layer

The material of the elastic layer 14 is not particularly limited, and there can be used a known material utilized as an elastic layer in fixing members such as fixing rotating members. Preferably, the elastic layer 14 contains a silicone rubber having excellent heat resistance. An addition-curable liquid silicone rubber is preferably used as the starting material of the silicone rubber.

The thickness of the elastic layer 14 can be designed as appropriate taking into consideration the surface hardness of the fixing rotating member and the width of the fixing nip portion that is to be formed. In a case where the fixing rotating member is the fixing belt 11, the thickness of the elastic layer 14 is preferably from 100 µm to 500 µm, more preferably from 200 µm to 400 µm.

In a case where the fixing rotating member is the fixing roller 12, the thickness of the elastic layer 14 is preferably from 0.1 mm (100 µm) to 3.0 mm, more preferably from 0.3 mm (300 µm) to 2.0 mm.

By setting the thickness of the elastic layer 14 to lie within this range it becomes possible to secure a sufficient width of the fixing nip portion at a time where the fixing rotating member is built into the fixing apparatus.

By virtue of the fact that the elastic layer contains silicone rubber of poor chemical affinity with fluorine oils, the fluorine oil contained in the surface layer does not easily migrate to the elastic layer, even after prolonged use, and is solely supplied to the surface of the fixing rotating member.

The elastic layer 14 may contain a filler. The filler is added in order to control thermal conductivity, heat resistance and elastic modulus.

Specific examples include silicon carbide (SiC), silicon nitride ($Si_3N_4$), silica ($SiO_2$), boron nitride (BN), aluminum nitride (AlN), alumina ($Al_2O_3$), iron oxide ($Fe_2O_3$), zinc oxide (ZnO), magnesium oxide (MgO), titanium oxide ($TiO_2$), copper (Cu), aluminum (Al), silver (Ag), iron (Fe), nickel (Ni), carbon black (C), carbon fibers (C) and carbon nanotubes (C).

A reaction control agent (inhibiting agent) referred to as an inhibitor for controlling the reaction start time may be formulated in the material that makes up the elastic layer 14. A known substance such as methyl vinyl tetrasiloxane, acetylene alcohol, a siloxane-modified acetylene alcohol or a hydroperoxide can be used as the reaction control agent.

(3) Surface Layer

A surface layer 15 contains a tetrafluoroethylene-perfluoroalkyl vinyl ether copolymer (PFA) and a perfluoropolyether (PFPE). As illustrated in FIG. 1B, the surface layer has pores 3 with openings at a first surface 101 that constitutes the outer surface of the fixing rotating member. The outer surface of the fixing rotating member is defined as the surface that comes in contact with unfixed toner on the material to be recorded at the time of fixing. Preferably, the pores 3 do not have a shell.

That is, the wall of the pores 3 is preferably made up of a solid portion of the surface layer, specifically, of a resin portion 1 that contains PFA.

At least part of the pores contains a perfluoropolyether (PFPE) 4. For example, the pores are filled with PFPE.

The surface layer further satisfies requirement 1) and requirement 2) below.

Requirement 1) the content of the perfluoropolyether in the surface layer is 20 mass % to 60 mass %.

Requirement 2) the degree of orientation A of PFA in the MD, in the surface layer, is 35 to 75%.

Concerning requirement 1) above, the content of perfluoropolyether in the surface layer is 20 mass % to 60 mass %, preferably 25 mass % to 60 mass %, and more preferably 25 mass % to 45 mass %. A content of PFPE within the above range further contributes to a stable migration, over longer periods of time, of PFPE towards the outer surface of fixing rotating member according to the present disclosure.

Concerning requirement 2) above, abrasion derived from contact between the first surface of the surface layer and the paper can be suppressed yet more reliably by virtue of the fact that the degree of orientation A is 35% or higher. Suppression of abrasion of the first surface of the surface layer allows maintaining, over long periods of time, openings which communicate with voids that are important in terms of stable migration of the PFPE present in the voids towards the first surface. As a result, the life of the fixing rotating member can be further prolonged.

By virtue of the fact that the degree of orientation A is 75% or lower, the occurrence of tearing in the surface layer in the TD can be reliably prevented, even upon repeated flexing of the surface layer derived from repeated rotation of the fixing rotating member while heating the fixing rotating member.

The degree of orientation A is preferably 40 to 70%, more preferably 50 to 60%.

To calculate the degree of orientation A, while rotating a sample prepared from the surface layer by 360° in the in-plane direction (β rotation), a relationship between the angle of β rotation and X-ray diffraction intensity is measured by using X-ray diffraction method in transmission mode. Specifically, a surface layer having an endless belt shape is cut open along the MD, to prepare a film-shaped sample. This sample is fixed to a sample attachment, which is in turn fixed to a rotating sample stage mounted on an X-ray diffractometer. The sample is placed in the X-ray diffractometer in such a manner that the TD of the surface layer and the measurement direction coincide with each other. As a result, the X-ray diffraction intensities obtained at rotation angles of 90° and 270°, upon rotation of the sample by 360° in the in-plane direction, denote the orientation state of PFA in the MD. The crystallized portion from among the PFA molecules is the portion of the tetrafluoroethylene (hereafter also referred to as "TFE") units. The crystalline structure derived from the TFE units exhibits a strongest peak when 2θ=18° in an X-ray diffraction measurement in the transmission mode. Thus, in the X-ray diffraction measurement for calculating the degree of orientation of the surface layer, β rotation of the sample is performed while 2θ is fixed at 18°.

Figure 6:
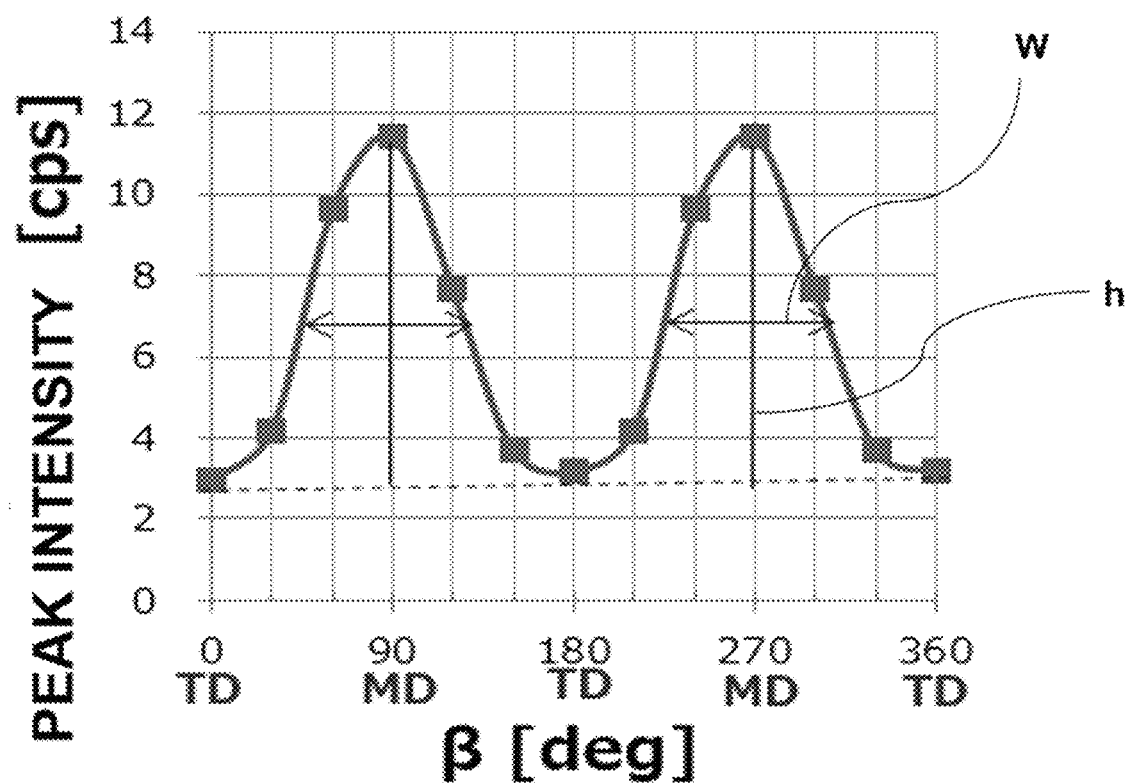
FIG. 6 is a graph illustrating a relationship between β rotation angle of a sample in which PFA molecules are oriented in the MD, and X-ray diffraction intensity.

FIG. 6 illustrates a graph resulting from plotting X-ray diffraction intensity relative to the β rotation angle, obtained in accordance with the above analysis method, for a sample prepared from a surface layer in which the PFA molecules are oriented in the MD. As stated above, the sample is placed so that the TD of the surface layer and the measurement direction coincide with each other; accordingly, peaks derived from PFA molecules oriented in MD appear at the positions of 90° and 270°. The stronger the orientation in the MD, the narrower becomes the half width W, and the sharper become the peaks.

Therefore, the degree of orientation A (%) in the MD of the PFA molecules in the surface layer can be expressed according to Expression (1) below.

$$A=[(360-\Sigma W)/360]\times 100 (\%)$$

The half width W is defined herein as the peak width at the ½ position of the distance (h) between a drawn base line, denoted a dotted line in FIG. 6, and the peak tops (at β rotation angles=90° and 270° in FIG. 6) of respective peaks denoting the orientation of the PFA molecules in the MD.

A method for producing a surface layer having such a degree of orientation A and containing 20 to 60 wt % of PFPE will be described below.

The average opening diameter of the openings in the outer surface of the surface layer is preferably from 1 nm to 5 μm, more preferably from 50 nm to 140 nm. Keeping the average opening diameter within the above ranges contributes to maintaining superior toner releasability stably. The average opening diameter of the openings in the first surface is herein the average value of the diameters of circles having the same surface area as the surface area of portions corresponding to the openings, from the binarized image used for the calculation of P1 described below. The concrete method involved will be described further on.

The thickness of the surface layer is preferably from 12 μm to 100 μm, more preferably from 15 μm to 85 μm. PFA The PFA contained in the surface layer will be described in detail next.

Herein PFA is a copolymer of perfluoroalkyl vinyl ether (hereafter "PAVE") and tetrafluoroethylene (hereafter "TFE"). The number of carbon atoms of the perfluoroalkyl chain of PAVE is preferably 1 to 6, more preferably 1 to 4, and yet more preferably 1 to 3.

Further, PAVE is preferably selected from among perfluoromethyl vinyl ether ($CF_2=CF-O-CF_3$), perfluoroethyl vinyl ether ($CF_2=CF-O-CF_2CF_3$) and perfluoropropyl vinyl ether ($CF_2=CF-O-CF_2CF_2CF_3$).

The melting point of PFA is preferably 280° C. to 320° C., more preferably 290° C. to 310° C.

A commercially available product can be used as the PFA; concrete examples are given below.

"451HP-J" "959HP-Plus", "350-J" and "950HP-Plus" (all product names, by Chemours-Mitsui Fluoroproducts Co., Ltd.);

"P-66P", "P-66PT" and "P-802UP" (all product names, by AGC Inc.);

"AP-230", "AP-231SH" and the like (all product names, by Daikin Industries, Ltd.); and "6502N" (product name, by The 3M Company.).

Perfluoropolyether (PFPE)

The PFPE contained in at least part of the pores will be described in detail next. The PFPE in the pores may be referred to as a "second" PFPE in order to distinguish it from the below-described PFPE (first PFPE) used for forming the pores. However, this does not rule out the second PFPE being the same PFPE as the first PFPE.

The second PFPE is not particularly limited, and known instances of PFPE can be used. Preferably, the PFPE has a structure represented by Formula (1) below. Preferably, the second PFPE is oil-like near the melting point of PFA, and is particularly preferably oil-like at a temperature lower than the melting point of PFA, for instance at 200° C.

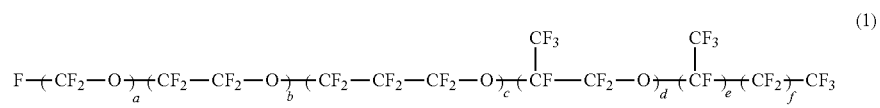

(1)

In Formula (1), a, b, c, d, e and f are each independently 0 or a positive integer, satisfy 1≤ a+b+c+d+e+f≤600, and at least one from among a, b, c and d represents a positive integer.

Further, the order in which each repeating unit is present in Formula (1) is not limited to the order described above. Further, each repeating unit in Formula (1) may be present at a plurality of sites in the PFPE. That is, the PFPE represented by Formula (1) may be a block copolymer or a random copolymer.

Examples of commercially available PFPE include for instance a PFPE having the structure represented by Formula (2) below (for instance Demnum S-200 and Demnum S-65 (both product names); by Daikin Industries, Ltd.), PFPE having the structure represented by Formula (3) below (for instance Krytox XHT-1000, Krytox VPF16256, Krytox GPL-107, Krytox GPL-106, Krytox GPL-105, Krytox GPL-104, Krytox GPL-103, Krytox GPL-102 and Krytox GPL-101 (all product names); by The Chemours Company), PFPE having the structure represented by Formula (4) below (for instance Fomblin M60, Fomblin M100 and Fomblin Z25 (all product names); by Solvay Specialty Polymers Co., Ltd.), and PFPE represented by Formula (5) below (for instance Fomblin Y45 and Fomblin Y25 (both product names); by Solvay Specialty Polymers Co., Ltd.).

Preferably, the perfluoropolyether has at least one structure selected from the group consisting of Formulas (2) to (5) below.

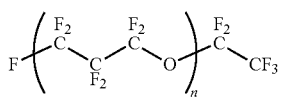

(2)

In Formula (2), n is a positive number, n lying in a range such that PFPE viscosity at a temperature of 40° C. ranges 30 to 500 mPa·s.

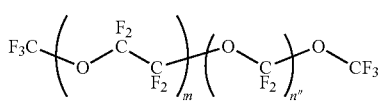

(3)

In Formula (3), n' is a positive number, n' lying in a range such that PFPE viscosity at a temperature of 40° C. ranges 10 to 2500 mPa·s.

(4)

In Formula (4), n″ and m are each independently a positive number, m/n″ is a number from 0.5 to 2, and n″+m is a number lying in a range such that the PFPE viscosity at a temperature of 40° C. ranges from 20 to 1400 mPa·s.

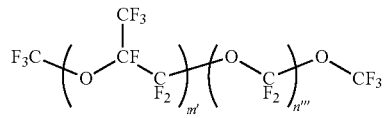

(5)

in Formula (5), n‴ and m′ are each independently a positive number, m′/n‴ is a number from 20 to 1000, and n‴+m′ is a number lying in a range such that PFPE viscosity at a temperature of 40° C. ranges from 20 to 1200 mPa·s.

The viscosity of the second PFPE is preferably 300 mPa·s to 2500 mPa·s, more preferably 350 mPa·s to 2000 mPa·s. Herein a PFPE within such a viscosity range contributes to a stable migration thereof from the pores to the first surface of the surface layer.

As used herein, the term viscosity denotes a value measured after 60 seconds of rotation at a shear velocity of 100 s$^{-1}$, and at a measurement temperature of 40° C., using a dynamic viscoelasticity measuring device (rheometer) that utilizes a cone plate having a cone angle of 1° and a cone radius of 20 mm. Examples of the viscoelasticity measuring device include "DHR-2" (product name, by TA Instruments Inc.).

Examples of commercially available PFPE within the above viscosity range include for instance "Krytox GPL-105" (viscosity 301 mPa·s), "Krytox GPL-106" (viscosity 459 mPa·s), "Krytox GPL-107" (viscosity 852 mPa·s), "Krytox VPF16256" (viscosity 1403 mPa·s), "Krytox XHT-1000" (viscosity 1941 mPa·s), "Fomblin M60" (viscosity 586 mPa·s) and "Fomblin M100" (viscosity 1327 mPa·s).

The content of perfluoropolyether in the surface layer is preferably from 20 mass % to 60 mass %, more preferably from 25 mass % to 45 mass %. When the content is 20 mass % or higher, toner releasability is better preserved over long periods of time. When the content is 60 mass % or lower, abrasion arising from the use of the surface layer can be more reliably prevented.

Preferably, the fixing rotating member according to the present disclosure further satisfies the requirement below. Specifically, a first observation region having 8 μm long×11 μm wide is placed on the outer peripheral surface of the PFA tube obtained after removing the PFPE in the pores of the surface layer, from the side of the first surface, using a solvent, and a ratio of a total sum of areas of the openings observed in the first observation region relative to an area of the first observation region is defined as P1; and a second observation region having 8 μm long×11 μm wide is placed in a predetermined position of a cross section of the surface layer after removing the PFPE in the pores of the surface layer, from the side of the first surface, using a solvent, the cross section including an entire thickness portion of the surface layer along the circumferential direction of the fixing rotating member, and a ratio of a total sum of a surface areas of the pores observed in the second observation region relative to an area of the second observation region is defined as P2; P2/P1 is 1.3 or higher.

By setting P1 and P2 to obey the above relationship, the surface layer can hold a sufficient amount of PFPE, and the PFPE can be allowed to migrate stably to the first surface. More preferably, P2/P1 is 5.0 or higher, and yet more preferably 7.0 or higher. From the viewpoint of striking a balance between the amount of PFPE that the surface layer can hold, and migration of PFPE to the first surface, the upper limit of P2/P1 is preferably 20.0 or lower, more preferably 15.0 or lower.

The method for calculating P1 and P2 is explained in detail in examples. Herein P1 is preferably 1.0% or higher, more preferably 1.5% or higher. The upper limit is preferably 15.0% or lower, more preferably 10.0% or lower. For instance, P1 is preferably from 1.0% to 15.0%.

By virtue of the fact that P1 is 1.0% or higher, migration of PFPE in the pores towards the first surface of the surface layer is hindered less readily, and stable toner releasability can be imparted to the first surface. When P1 is 15.0% or lower, excessive migration of PFPE in the pores to the first surface can be suppressed, which contributes to maintaining stable toner releasability over long periods of time Further, P2 is preferably 20.0% or higher, more preferably 25.0% or higher. The upper limit is not particularly restricted, but is preferably 60.0% or lower, more preferably 50.0% or lower. For instance, P2 is preferably from 20.0% to 60.0%.

When P2 is 20.0% or higher, the surface layer can hold more PFPE and stable toner releasability can be imparted to the first surface over longer periods of time. On the other hand, abrasion of the surface layer can be better prevented by setting P2 to be 60.0% or lower.

Method for Producing a Fixing Rotating Member

A non-limiting exemplary method for producing the above fixing rotating member according to one aspect of the present disclosure includes steps (i) to (vi) below. However, step (vi) is an optional step that is necessary in a case where the above-mentioned P2/P1 is set to 1.3 or higher. An example in which a PFA tube is used to produce the surface layer is illustrated herein, but the surface layer according to the present disclosure is not limited to being formed using a PFA tube.

Step (i): providing a tube (hereafter also referred to as "PFA tube") containing PFA having a degree of orientation A according to the present disclosure;

step (ii): producing a base layer having an endless belt shape or a roller shape, an elastic layer on the outer peripheral surface of the base layer, and a layered body of the elastic layer, and then covering the outer peripheral surface of the layered body with the PFA tube provided in step (i), to thereby provide a PFA tube-coated layered body;

step (iii): immersing the PFA tube-coated layered body in the first PFPE at a temperature range from 25° C. up to below Tp, where Tp (° C.) is the melting point of PFA that makes up the PFA tube, to impregnate the resin tube with the first PFPE (impregnation step-1);

step (iv): cooling the PFA tube-coated layered body obtained in step (iii) and in which the PFA tube is impregnated with the first PFPE, down to room temperature (25° C.);

step (v): removing, with a solvent, at least part of the first PFPE in the PFA tube of the PFA tube-coated layered body obtained in step (iv), from the side of the surface (outer peripheral surface) on the opposite side of the PFA tube to the side facing the elastic layer, to thereby form, inside the PFA tube, pores with openings in the outer peripheral surface of the PFA tube; and step (vi): incorporating a second perfluoropolyether into at least part of the pores, to obtain a fixing rotating member having a surface layer that contains the second perfluoropolyether in at least part of the pores (impregnation step-2).

As a method for obtaining a PFA tube having a degree of orientation A 35 to 75% according to step (i), the PFA tube can be produced for instance by extruding molten PFA from a cylindrical die. The PFA molecules become readily oriented in the flow direction, i.e. the MD, through extrusion molding of molten PFA. As a result, there can be easily produced a PFA tube having a degree of orientation in the range from 35 to 75%. The degree of orientation A of the PFA tube produced by cylindrical extrusion molding (hereafter also referred to as "cylindrically extruded PFA tube" can be controlled for instance on the basis of the temperature of PFA at the time of cylindrical extrusion molding. Within an ordinary temperature range (for instance, 300 to 400° C.) adopted in melt extrusion of PFA, the lower the temperature, the relatively higher the viscosity of PFA becomes at the time of extrusion and the higher becomes the internal stress of the molten PFA flowing in the extrusion direction, and thus orientation of the molecules in the MD can be increased. By contrast, the higher the temperature, the relatively lower the viscosity of PFA becomes, and thus the orientation of the molecules in the MD can be reduced.

The impregnation amount of the first PFPE into the PFA tube can be adjusted for instance on the basis of the temperature of the first PFPE and the viscosity of the first PFPE, and on the basis of the contact time of the resin layer and the first PFPE, at the time of impregnation. Specifically, for instance, the higher the temperature of the first PFPE in the range from 25° C. to below Tp, the lower becomes the viscosity of the first PFPE, or the longer the contact time, the greater can be made the impregnation amount of the first PFPE into the PFA tube.

A preferred viscosity of the first PFPE is herein 350 mPa·s or lower, in particular 320 mPa·s or lower, and further 120 mPa·s or lower. The lower limit is not particularly restricted, but is preferably 10 mPa·s or higher, in particular 25 mPa·s or higher. The viscosity of the first PFPE can be set for instance to range from 10 mPa·s to 350 mPa·s.

Examples of commercially available PFPE in such viscosity ranges include "Krytox GPL-101" (viscosity 12 mPa·s), "Krytox GPL-102" (viscosity 26 mPa·s), "Krytox GPL-103" (viscosity 54 mPa·s), "Krytox GPL-104" (viscosity 111 mPa·s), "Fomblin M03" (viscosity 30 mPa·s) and "Krytox GPL-105" (viscosity 301 mPa·s).

For instance a PFPE-containing PFA tube having a first PFPE content of 25 mass % can be produced over a contact time of 1 minute in a case where the viscosity of the first PFPE is 54 mPa·s, the thickness of the PFA tube is 20 the degree of orientation A of the PFA tube is 35°, the melting point Tp of the PFA tube is 296° C., and the temperature of the first PFPE brought into contact with outer peripheral surface of the PFA tube is 280° C. The term content is herein defined as the percentage (%) of the mass of the PFPE impregnated into the resin layer with respect to the sum of the mass of the resin layer itself plus the mass of the PFPE impregnated into the resin layer. Then the PFPE is removed using a solvent, from the PFPE-containing PFA tube having a PFPE content of 25 mass %, as a result of which a PFA tube is obtained that has voids and for which the below-described value of P2 is 28%.

The viscosity of "Krytox GPL106" as the PFPE used in the examples of WO 2019/181796 is 459 mPa·s. Upon contact of such PFPE with the PFA tube containing PFA at a temperature of 345° C. for 5 minutes, a PFPE-containing PFA tube was obtained that had a PFPE content of 24 mass %. When the content of PFPE stands at that level, however, PFPE does not aggregate with each other in the PFA tube. Accordingly, pores did not form in the PFA tube even upon subsequent elution of the PFPE using a fluorine-based solvent.

In step (iii) (impregnation step-1), the content of PFPE in the resin layer impregnated with the first PFPE is preferably 25 mass % to 50 mass %, more preferably 30 mass % to 45 mass %.

Any method can be used as the contact method of the PFA tube and PFPE in the production of the fixing rotating member, so long as the PFPE can be brought into contact with the resin layer at a temperature from 25° C. to below Tp.

Further, the PFA tube that is brought into contact with PFPE may be a PFA tube of a layered body in which a base layer, an elastic layer, and a resin layer are laid up on each other beforehand; alternatively, the PFA tube may be a PFA tube in a state where a surface thereof to be bonded to the elastic layer is masked. A dipping method is a further example of the contact method.

In a case where the temperature of the first PFPE is set for instance to 280° C. or higher in step (iii), the PFA tube-coated layered body is cooled down for instance to room temperature of about 25° C. in step (iv), since the PFA tube impregnated with the first PFPE in step (iii) is in a high-temperature state. The PFA tube having expanded in step (iii) contracts thus as a result of this cooling process. The first PFPE in the vicinity of the outer surface of the PFA tube is released at that time to the exterior of the PFA tube.

Through removal of the first PFPE from the PFA tube by means of a solvent in step (v), pores opened in the outer peripheral surface of the PFA are formed at sites where the first PFPE was present.

As a result of steps (iv) and (v), in the PFA tube, the surface area proportion P2 of the pores per unit area in a cross section parallel to the circumferential direction of the layered body can be made higher than the surface area proportion P1 of the openings per unit area in the first surface. The underlying reasons are unclear, but although the PFA tube that has thermally expanded on account of the heating in step (iii) shrinks in the cooling process of step (iv), cooling progresses more quickly at the first surface of the PFA tube, and accordingly the extent of shrinkage is larger than at the elastic layer-side surface of the PFA tube. The first PFPE present in the vicinity of the first surface of the PFA tube is pushed out of the PFA tube from the first surface, accompanying shrinkage of the first surface side. The diameter of the openings in the first surface of the PFA tube shrinks as a result. On the other hand, the first PFPE having permeated deep into the PFA tube, in the thickness direction thereof, for instance down to a position in the vicinity of the surface on the elastic layer side, is not released to the exterior of the PFA tube even upon shrinkage of the PFA tube, but remains within the PFA tube. Aggregate portions of the first PFPE, which constitute voids after removal of the first PFPE, exhibit therefore virtually no reduction in size. In consequence there increases the proportion (P2/P1) of the porosity P2 relative to the opening ratio P1 at the first surface of the fixing rotating member formed as a result of step (v).

The value of P2/P1 can be adjusted on the basis of the impregnation amount of the first PFPE into the PFA tube in the impregnation step-1 of step (iii). Specifically, increasing the impregnation amount of the PFPE into the PFA tube allows increasing the voids formed in the interior of the PFA tube, such that the value of P2 increases. Increasing the amount of impregnation into the PFA tube also translates into a greater number of openings in the first surface of the PFA tube, and therefore likewise in an increased value of P1. Although for unclear reasons, however, the degree of increase in P1 derived from an increase in the impregnation amount into the PFA tube is larger herein than the degree of increase in P2. Accordingly, P2/P1 can be adjusted to be smaller by increasing the impregnation amount of first PFPE into the PFA tube.

In order to remove the first PFPE impregnated into the PFA tube in step (v), the PFA tube is immersed in a solvent which is capable of dissolving the first PFPE but does not dissolve PFA, in such a manner that the outer peripheral surface of the PFA tube is wetted. The term "solvent that dissolves PFPE" encompasses for instance solvents such that the dissolution amount of PFPE in 100 g of the solvent at 25° C. is 10 g or greater. Meanwhile, the term "solvent which does not dissolve PFA" encompasses solvents such that the dissolution amount of PFA in 100 g of the solvent at 25° C. is 1 g or smaller. Such a solvent includes a hydrofluoroether (product name: NoveC 7600, by The 3M Company).

Ultrasounds is preferably applied to the PFA tube during the removal of the first PFPE from the PFA tube in step (v) in terms of promoting removal of the first PFPE from the PFA tube.

A method for producing a fixing rotating member according to one aspect of the present disclosure will be described more specifically next.

In step (iii), a layered body being a stack of a base layer, an elastic layer containing a silicone rubber, and a PFA tube satisfying the degree of orientation A according to the present disclosure, in this order, is mounted on a dipping device. The layered body is immersed in a bath of a perfluoropolyether heated to a temperature T in the range from room temperature to below the melting point Tp (° C.) of PFA (for instance, Tp−100° C.≤T≤Tp−5° C., preferably Tp−20° C.≤T≤Tp−5° C.), and is allowed to stand preferably 20 seconds to 5 minutes, more preferably 30 seconds to 2 minutes (for instance, for 1 minute) (Impregnation step-1).

In impregnation step-1, the higher the temperature within the above temperature range and the lower the viscosity of PFPE, the greater can be made the impregnation amount of PFPE into the PFA tube. Changes in the molecular orientation of the PFA tube between before and after step (iii) can be prevented by eliciting contact at a temperature lower than the melting point Tp (° C.) of PFA.

Herein X−Tp (° C.), where X (° C.) is the temperature of the first PFPE in the impregnation step-1, is preferably −40° C. to 0° C., more preferably −40° C. to −5° C., and yet more preferably −20° C. to −5° C.

In step (v), the layered body is impregnated with a solvent capable of dissolving the first PFPE, to cause the first PFPE with which the PFA tube is impregnated to elute through the openings of the outer peripheral surface of the PFA tube (pore formation step). As a result of this step, pores opened in the outer peripheral surface of the PFA tube is formed.

In step (vi) the layered body provided with the PFA tube having pores, obtained in step (v), is immersed in a bath of a second perfluoropolyether, and is allowed to stand preferably for 5 minutes to 30 minutes, more preferably for 10 minutes to 20 minutes (for instance 15 minutes). As a result, the second PFPE is incorporated into the pores in the PFA tube (impregnation step-2).

The temperature of the second PFPE at this time is preferably a temperature that allows promoting impregnation of the second PFPE into the pores but such that the openings in the first surface of the PFA tube do not disappear. As a non-limiting example, the lower limit of the temperature of the second PFPE in the present step is preferably 180° C. or higher, and the upper limit is preferably 280° C. or lower, more preferably 230° C. or lower.

The layered body obtained as a result of step (vi) is retrieved from the second perfluoropolyether bath, and the second PFPE adhered to the outer surface is removed, to thereby yield a fixing rotating member according to one aspect of the present disclosure.

In the present step, the method for removing the excess amount of the PFPE adhered to the surface is not particularly limited, and examples thereof include washing with a solvent (preferably a fluorosolvent), removal with air, and wipe-off using a nonwoven fabric. Examples of methods for washing with a solvent (preferably a fluorosolvent) include a removal method using fibers such as a nonwoven fabric, soaked with a solvent (preferably a fluorosolvent).

2. Fixing Apparatus

The fixing apparatus includes a fixing rotating member and a heater for heating the fixing rotating member. The fixing apparatus includes for instance a heating rotating member, and a pressing rotating member disposed so as to form a fixing nip portion with the heating rotating member.

Examples of a combination of a heating rotating member and a pressing rotating member include for instance a heat roller and an elastic pressure roller disposed opposing the heat roller, and a fixing belt and an elastic pressure roller disposed in contact with the fixing belt. Other examples of a combination of a heating rotating member and a pressing rotating member include a heating belt and an elastic pressure roller disposed in contact with the heating belt, and a heating belt and an elastic pressure belt disposed in contact with the heating belt.

(1) Fixing Apparatus Using a Fixing Belt

FIG. 3 is a cross-sectional diagram of a fixing apparatus having the fixing belt 11 for heating and an elastic pressure roller 19, along the circumferential direction of a fixing belt.

The fixing belt 11 is the fixing belt described as the above fixing rotating member. The fixing belt 11 is loosely fitted from outside a belt guide member 16. A pressing rigid stay 18 is inserted inward of the belt guide member 16. The belt guide member 16 is formed of for instance a heat-resistant/heat-insulating resin.

The heater is for instance a heater disposed in contact with the inner peripheral surface of the fixing belt. A ceramic heater 17 as a heat source is provided at a position at which the belt guide member 16 and the inner surface of the fixing belt 11 are in contact with each other. The ceramic heater 17 is fitted to and fixed in a groove provided along the longitudinal direction of the belt guide member 16. The ceramic heater 17 generates heat through energization by a means not shown.

The elastic pressure roller 19 is provided for instance with an elastic layer 19b containing a cured silicone rubber, on the peripheral surface of a core metal 19a made of stainless steel. A surface layer 19c containing a fluororesin is provided on the peripheral surface of the elastic layer 19b. The thickness of the surface layer 19c is for instance 50 μm.

A push-down force is exerted on the pressing rigid stay 18 by arranging pressure springs (not shown) between both ends of the pressing rigid stay 18 and spring receiving members (not shown) on the device chassis side. As a result, the lower face of the ceramic heater 17 disposed on the lower face of the belt guide member 16 and the top face of the elastic pressure roller 19 are pressed against each other, with the fixing belt 11 nipped in between, to form a predetermined fixing nip portion N. That is, the lower face of the ceramic heater 17 is disposed in contact with the inner peripheral surface of the fixing belt 11.

A recording medium P as a body to be heated having formed thereon an image by unfixed toner G is nipped and transported in the fixing nip portion N at a transport speed V. The toner image is heated and pressed as a result. In consequence the toner image melts, with color mixing, after which the toner image is cooled, whereby a toner image becomes fixed as a result on the recording medium P.

(2) Heat Fixing Apparatus Using a Fixing Roller

Figure 4:
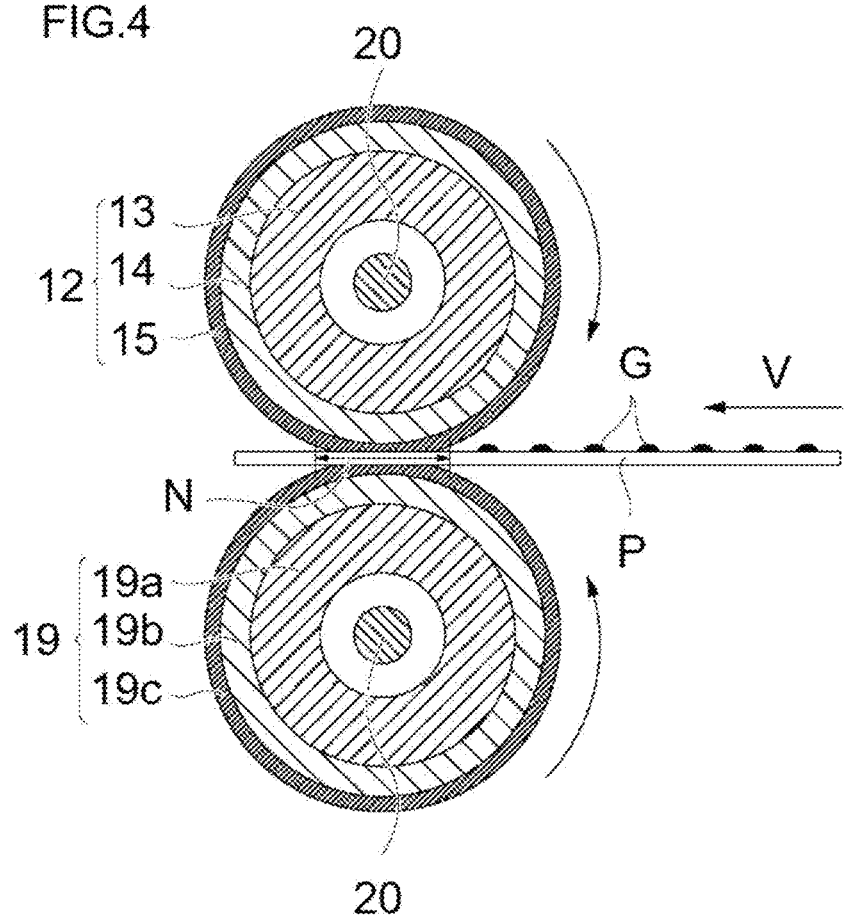
FIG. 4 is a cross-sectional schematic diagram of a fixing apparatus that utilizes a fixing roller.

FIG. 4 is a cross-sectional diagram along the circumferential direction of a fixing roller in a heat fixing apparatus that is provided with the fixing roller 12 for heating, the elastic pressure roller 19 disposed opposing the fixing roller 12, and a heater 20 which is a heater of the fixing roller 12.

The fixing roller 12 is the fixing roller described as the above fixing rotating member. In the fixing roller 12 there are formed the elastic layer 14 on the outer peripheral surface of a hollow core metal as the base layer 13, and the release surface layer 15 on the outer side of the elastic layer 14.

The fixing roller 12 and the elastic pressure roller 19 are rotatably pressed against each other, by a pressure means not shown, so that the fixing nip portion N is formed as a result.

The heater 20 as a heat source for supplying heat necessary for melting the unfixed toner G is installed inside the fixing roller 12 and inside the elastic pressure roller 19. A halogen heater is generally used as the heater 20. A plurality of halogen heaters may be installed in the interior of the rollers depending on the size of the recording medium P to be transported.

Respective rotational forces are applied to the fixing roller 12 and the elastic pressure roller 19 through the ends of the base layer (core metal) 13 and the core metal 19a, by a means not shown, the rotation being controlled herein so that the moving speed of the surface of the fixing roller 12 is substantially equal to the transport speed V of the recording medium P. At this time, the rotational force may be applied to either one of the fixing roller 12 and the elastic pressure roller 19 having elasticity, so that the other roller rotates by being driven; alternatively, the rotational force may be applied to both rollers.

The recording medium P that is a body to be heated having formed thereon an image by the unfixed toner G is nipped and transported at the fixing nip portion N of the fixing apparatus formed as described above. The toner image is heated and pressed as a result. In consequence the toner image melts, with color mixing, after which the toner image is cooled, and a toner image becomes fixed as a result on the recording medium P.

3. Electrophotographic Image Forming Apparatus

A known configuration can be adopted as the electrophotographic image forming apparatus. Such apparatuses include multifunction devices, copiers, fax machines and printers that utilize an electrophotographic system. The overall structure of an electrophotographic image forming apparatus will be explained schematically herein using a color laser printer as an example.

Figure 5:
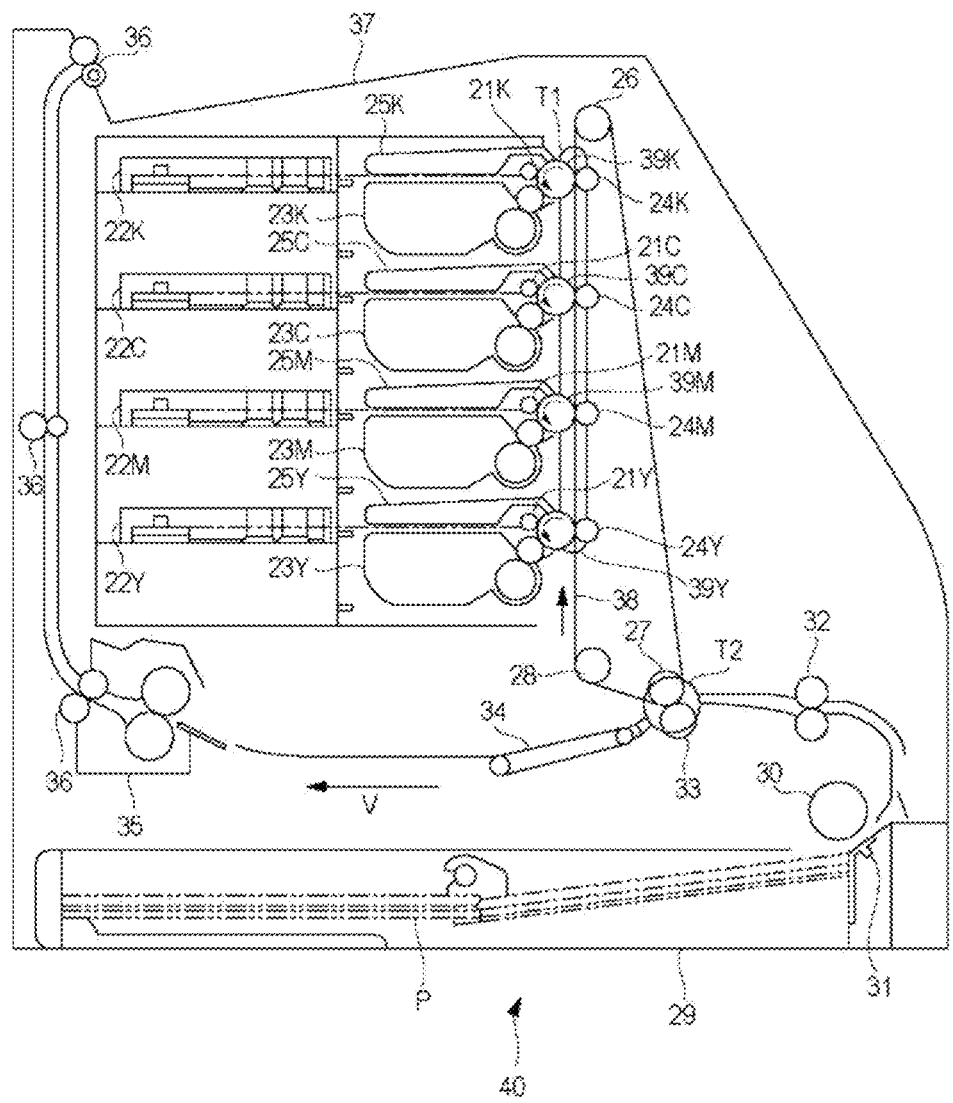
FIG. 5 is a schematic cross-sectional schematic diagram illustrating one aspect of an electrophotographic image forming apparatus.

FIG. 5 is a schematic cross-sectional diagram of a laser printer 40. The laser printer 40 illustrated in FIG. 5 has respective "electrophotographic photosensitive member drums 39 (hereafter referred to as "photosensitive member drums 39") that rotate at a constant speed for each respective color including yellow (Y), magenta (M), cyan (C) and black (K). The laser printer 40 further has an intermediate transfer member 38 which holds a color image, developed at an image forming section and resulting from multiple transfer, and which transfers the color image to the recording medium P that is fed from a feeding unit.

Each photosensitive member drum 39 (39Y, 39M, 39C, 39K) is rotationally driven counterclockwise, as illustrated in FIG. 5, by a driving means (not shown).

Around each photosensitive member drum 39 there are sequentially disposed, according to the rotation direction thereof, a respective charging device 21 (21Y, 21M, 21C, 21K) that charges uniformly the surface of the photosensitive member drum 39, a respective scanner unit 22 (22Y, 22M, 22C, 22K) that projects a laser beam, on the basis of image information, to form an electrostatic latent image on the photosensitive member drum 39, a respective developing unit 23 (23Y, 23M, 23C, 23K) that causes toner to adhere onto the electrostatic latent image, to thereby develop the toner in the form of a toner image, a respective primary transfer roller 24 (24Y, 24M, 24C, 24K) that transfers the toner image on the photosensitive member drum 39 to the intermediate transfer member 38, at a primary transfer section T1, and a respective cleaning unit 25 (25Y, 25M, 25C, 25K) having a cleaning blade that removes untransferred toner remaining on the surface of the photosensitive member drum 39 after transfer.

At the time of image formation, the belt-shaped intermediate transfer member 38 spanned around rollers 26, 27 and 28 rotates and the color toner images formed on respective photosensitive member drums 39 undergo primary transfer, superimposed on each other, onto the intermediate transfer member 38, so that a color image is formed as a result.

The recording medium P is then transported to a secondary transfer section T2 by a transport means, in synchrony with primary transfer to the intermediate transfer member 38. The transport means includes a feed cassette 29 that accommodates a plurality of sheets of the recording medium P, a feed roller 30, a separation pad 31, and a resist roller pair 32. At the time of image formation, the feed roller 30 is rotationally driven in accordance with the image forming operation, the recording medium P in the feed cassette 29 is separated sheet by sheet, and is transferred by the resist roller pair 32 to the secondary transfer section T2 at a timing synchronized with the image formation operation.

A movable secondary transfer roller 33 is disposed in the secondary transfer section T2. The secondary transfer roller 33 can move substantially in the vertical direction. At the time of image transfer, the secondary transfer roller 33 is pressed against the intermediate transfer member 38 with a predetermined pressure, via the recording medium P. Simultaneously therewith, bias is applied to the secondary transfer roller 33, and the toner image on the intermediate transfer member 38 becomes transferred to the recording medium P.

The intermediate transfer member 38 and the secondary transfer roller 33 are each driven, and accordingly the recording medium P nipped between the intermediate transfer member 38 and the secondary transfer roller 33 is transported in the direction of the left arrow in FIG. 5 at a predetermined transport speed V; the recording medium P is then further transported, by the transport belt 34, to the fixing unit 35 which is a subsequent process. In the fixing unit 35 the transferred toner image is fixed on the recording medium P through application of heat and pressure. The recording medium P is then discharged onto a discharge tray 37, on the top face of the apparatus, by discharge roller pairs 36.

An image forming apparatus capable of delivering a high-quality image of excellent image uniformity can be thus achieved by utilizing the fixing apparatus illustrated in FIG. 3 and FIG. 4 in the fixing unit 35 of the electrophotographic image forming apparatus illustrated in FIG. 5.

One aspect of the present disclosure allows providing a fixing rotating member capable of maintaining high toner releasability over longer periods of time than in conventional instances, and capable of maintaining abrasion resistance against paper. Another aspect of the present disclosure allows achieving a fixing apparatus and an electrophotographic image forming apparatus that contribute to forming stably high-quality electrophotographic images. Yet a further aspect of the present disclosure makes it possible to achieve a method for producing a fixing rotating member capable of maintaining high toner releasability over longer periods of time than in conventional instances, and capable of maintaining abrasion resistance against paper.

EXAMPLES

The present disclosure will be specifically described next with reference to examples. The present disclosure is not limited to the following examples.

In the present example a fixing member being a fixing rotating member was produced using the PFA resin and the perfluoropolyether below. Specifically, the perfluoropolyether that was used had at least one structure selected from the group consisting of Formulae (2) to (5) above.

Fluororesin
  PFA-1: "959HP-Plus" (product name, by Chemours-Mitsui Fluoroproducts Co., Ltd.)
Perfluoropolyether
  PFPE-1: "Krytox GPL103" (product name, by The Chemours Company, 54 mPa·s (40° C.))
  PFPE-2: "Krytox GPL104" (product name, by The Chemours Company, 111 mPa·s (40° C.))
  PFPE-3: "Krytox VPF16256" (product name, by The Chemours Company, 1403 mPa·s (40° C.))
  PFPE-4: "Krytox XHT-1000" (product name, by The Chemours Company, 1941 mPa·s (40° C.))
  PFPE-5: "Fomblin M100" (product name, by Solvay Specialty Polymers Co., Ltd., 1327 mPa·s (40° C.))
  PFPE-6: "Krytox GPL106" (product name, by The Chemours Company, 459 mPa·s (40° C.))

Example 1

Production of a Fixing Belt

As a base layer there was prepared base material obtained through nickel electroforming and having an endless belt shape with an inner diameter of 30 mm, a width of 400 mm, and a thickness of 40 µm. The outer peripheral surface of this base material was subjected to a primer treatment.

As a starting material for forming the elastic layer there was prepared an addition-curable liquid silicone rubber (product name: SE1886, by Dow Corning Toray Co., Ltd.) containing no filler. To 61 parts by volume of this liquid silicone rubber there were added 38 parts by volume of spherical alumina (product name: Alunabeads CB-A30S, by Showa Denko KK) as a spherical filler, and 1 part by volume of gas-phase carbon fibers (product name: VGCF-S, by Showa Denko KK, aspect ratio=100, average fiber length=10 µm).

An addition-curable silicone rubber composition for forming an elastic layer was thus prepared in this manner. The above composition was applied by ring coating onto the outer peripheral surface of the above base material, followed by heating for 4 hours at a temperature of 200° C., to elicit crosslinking of the layer of the addition-curable silicone rubber composition, and form thereby an elastic layer having a thickness of 300 µm.

The elastic layer surface was irradiated with ultraviolet rays in an ambient atmosphere, using an ultraviolet lamp disposed at a position spaced by 10 mm from the surface of the elastic layer, while the base material having the elastic layer formed thereon was caused to rotate at a moving speed of 20 mm/second. The ultraviolet lamp used herein was a low-pressure mercury ultraviolet lamp (product name: GLQ500US/11, by Toshiba Lighting & Technology Corporation), and irradiation was performed so that the integrated light intensity on the irradiated surface, at a wavelength of 185 nm, was 800 mJ/cm².

The surface of the elastic layer was then coated substantially uniformly, to a thickness of about 20 with an addition-curable silicone rubber adhesive (product name: SE1819CV, equal mixture of "liquid A" and "liquid B", by Dow Corning Toray Co., Ltd.).

Herein PFA-1 molten at a temperature of 360° C. was shaped by being cylindrically extruded, to produce a PFA tube (thickness 20 melting point Tp=296° C.) having a degree of orientation A of 35%. The inner peripheral face of the PFA tube was subjected to a hydrophilizing treatment, the resulting PFA tube was laid on the coated surface of the addition-curable silicone rubber adhesive of the elastic layer, with uniform squeezing from above the PFA tube, to thereby remove excess adhesive from between the elastic layer and the fluororesin tube.

The base layer coated with the elastic layer and the PFA tube was placed then in an electric furnace set to at a temperature of 200° C., and the whole was heated for 1 hour, to cure the addition-curable silicone rubber adhesive and fix the fluororesin tube to the elastic layer, after which both ends were cut off, to yield a 343 mm-wide layered body for a fixing belt.

Production of a Fixing Belt: Contact Impregnation of a Perfluoropolyether Impregnation Step-1

A perfluoropolyether (PFPE-1) was placed in a graduated cylinder made of borosilicate glass. A heating wire covered with a thermal insulation material was wound around the whole graduated cylinder, and the graduated cylinder was heated up so that the temperature of the PFPE was 280° C. This fixing belt thus produced was mounted on a dipping device, and the layered body was immersed in the heated first PFPE for 1 minute, and was then retrieved.

Evaluation A-1: Measurement of the Content of the First PFPE in the PFA Tube Containing the First PFPE The content of the first PFPE in the obtained PFA tube impregnated with the first PFPE was measured in accordance with the following method. Specifically, a multilayer sample of the PFA tube and the resin layer was cut out from the layered body. The multilayer sample was next immersed in a silicone resin dissolving agent (product name: e-Solve 21RS, by Kaneko Chemical Co., Ltd.), to dissolve the silicone rubber and silicone rubber adhesive in the elastic layer, as a result of which the elastic layer and the adhesive layer were removed from the multilayer sample. A measurement sample made up of only the entire thickness portion of the PFA tube was prepared in this manner. This measurement sample was measured using a thermogravimetric analyzer (TGA) under the conditions below, and the content (mass %) of the first PFPE with respect to the resin layer containing the first PFPE was calculated.

Instrument: TGA851 (product name, by Mettler-Toledo International Inc.)
Atmosphere: air
Temperature: 425° C.

In a profile of measurement time-weight loss rate obtained on the basis of the above thermogravimetric analysis, a linear least squares approximation expression was worked out from the region at which the slope was constant and at which only PFA decreased. The intercept of the linear least squares approximation expression was taken as the PFA content (mass %), and the first PFPE content was calculated as first PFPE content (mass %)=100-PFA content).

Pore Formation Step

The layered body obtained in the above impregnation step-1 was immersed in a graduated cylinder containing a separately prepared fluorosolvent (product name: NoveC 7300, by The 3M Company) for 10 minutes. Next, the graduated cylinder was placed in a water tank of an ultrasonic cleaning device (product name: Bransonic (model 2510J-DTH); by Emerson Japan, Ltd.), and was irradiated with ultrasounds for 60 minutes. After the treatment, the layered body was retrieved from the graduated cylinder and was dried by being allowed to stand in an environment at a temperature of 25° C. for 60 minutes. A layered body was thus obtained from which there was removed PFPE present on the outer peripheral surface and in the interior of the of the PFA tube. The visual appearance of the obtained layered body was white, and pores were observed to have formed in the PFA tube.

FIG. 1A and FIG. 1B depict schematic diagrams of observation images, by scanning electron microscopy, of the outer peripheral surface (first surface) of the PFA tube of the obtained layered body, and of a cross section of the layered body in a direction along the circumferential direction.

FIG. 1A is a schematic diagram of an SEM image of the first surface. A resin portion 1 containing PFA and openings 2 were observed. FIG. 1B is a schematic diagram of an SEM image of a thickness-direction cross section of the PFA tube in a direction along the circumferential direction of the layered body. The resin portion 1 containing PFA and the pores 3 were observed herein. It was found that the pores 3 had openings in the first surface 101 and had thus openings in the first surface.

Evaluation A-2: Measurement and Calculation of the Opening Ratio P1, Average Opening Diameter and Porosity P2 on the First Surface of the PFA Tube The opening ratio P1 and the average opening diameter of the first surface of the PFA tube were calculated as follows.

The surface of the layered body having had the first PFPE removed therefrom, as obtained in the above pore formation step, i.e. the surface of the PFA tube on the opposite side to the side facing the elastic layer, was observed using a scanning electron microscope, and a SEM image (10000 magnifications) of a rectangular 8 μm long×11 μm wide observation region was acquired. The resolution was set to 717 pixels longitudinally and 986 pixels transversally so that the openings could be recognized. The acquired SEM image was converted into an 8-bit gray scale image using image processing software (product name: ImageJ, by the National Institutes of Health (NIH)). After application of a median filter to the obtained gray scale image, a binarization process was further carried out using the above image processing software, to obtain a binarized image. The binarization process relied on the YEN method (see IEEE transactions on Image Processing Vol. 4, Issue: 3, March 1995, pp. 370-378), to discriminate between portions corresponding to the openings and portions corresponding to PFA in the SEM image. A ratio of the number of pixels of the portions corresponding to the openings in the obtained binarized image relative to the number of pixels of the entire image was then calculated. The observation regions were disposed at 10 arbitrary locations on the first surface of the PFA tube, and the arithmetic mean value of the ratios calculated from respective observation regions was taken as P1. The observation regions were set to positions such that the observation regions did not overlap each other.

The surface areas of the portions corresponding to the openings in each binarized image were approximated to respective true circles of surface area identical thereto, and the arithmetic mean value of the diameters of the true circles (hereafter circle-equivalent diameters) was taken as the average opening diameter.

The porosity P2 was calculated as follows.

From the PFA tube of the layered body having had the first PFPE removed therefrom a cross-sectional sample was cut out using a Cryo-Ultra-microtome (by Leica Microsystems GmbH), so that a thickness-direction cross section of the PFA tube in a direction along the circumferential direction of the layered body appeared on the sample. The cross section was set to include the entire thickness portion of the resin layer.

Next, the cross section was observed under a scanning electron microscope, and an SEM image of an observation region 8 µm long×11 µm wide was acquired. The resolution was set to 717 pixels longitudinally and 986 pixels transversally so that the pores appearing in the cross section could be discerned.

The SEM image was binarized using numerical calculation software (product name: MATLAB; by The MathWorks, Inc.) to obtain a binarized image. The binarization process relied on Otsu's method (see IEEE transactions on SYSTEMS, MAN, AND CYBERNETICS, VOL. SMC-9, NO. 1, January 1979, PP. 62-66) to discriminate between portions corresponding to the pores and portions corresponding to PFA, in the SEM image.

A ratio of the number of pixels of the portions corresponding to the pores in the binarized image relative to the number of pixels of the entire image was then calculated. The thickness-direction acquisition positions of the SEM images in the cross section of each cross-sectional sample were set to three locations as prescribed in (i) to (iii) below.

(i) In the cross section of the cross-sectional sample, a position such that 1 µm is the upper end of the observation region from the first surface of the PFA tube to the other surface (hereafter also referred to as "second surface"), and such that the long sides of the observation region are parallel to the first surface.

(ii) In the cross section of the cross-section sample, a position such that a midpoint between the first surface and the second surface of the PFA tube, and the barycenter of the observation region, match each other and such that the long sides of the observation region are parallel to the first surface.

(iii) In the cross section of the cross-section sample, a position such that 1 µm from the second surface towards the first surface of the PFA tube is the lower end of the observation region, and the long sides of the observation region are parallel to the second surface.

Samples for the above operation were acquired from three locations at every 120° in the circumferential direction of the layered body.

Therefore, a total of nine SEM images were obtained in accordance with the above operation, and nine ratios were calculated on the basis of the binarized images created from the SEM images. The arithmetic mean value of these nine ratios was taken as the porosity P2.

Impregnation Step-2

The following operations were performed then on the layered body provided with the PFA tube having pores and obtained as a result of the above pore formation step. Specifically, the second PFPE (PFPE-3) was placed in a graduated cylinder made of borosilicate glass.

A heating wire covered with a thermal insulation material was wound around the whole graduated cylinder, and the second PFPE was heated to 200° C. Next, the layered body was attached to a dipping device, and the entire layered body was immersed in the second PFPE bath at 200° C. for 15 minutes, and was then retrieved.

Next, the second PFPE adhered to the outer surface of the retrieved layered body was removed using a nonwoven fabric impregnated with a fluorine-based solvent (product name: Novec 7300; by The 3M Company). The fixing belt according to the present embodiment was obtained in this manner. FIG. 1C illustrates a schematic diagram of an observation image, by scanning electron microscopy, of a cross section of a surface layer in a direction along the circumferential direction of the obtained fixing belt. It was found that the pores 3 observed in FIG. 1B became filled with the second PFPE 4 as a result of the impregnation step-2.

Evaluation A-3: Measurement of the Content of the Second PFPE in the Surface Layer Similarly to Evaluation A-1, a measurement sample of an obtained fixing belt was prepared which was made up of only the entire thickness portion of the PFA tube. This measurement sample was measured using a thermogravimetric analyzer (TGA) under the under the conditions below, and there was calculated the content ratio (mass %) of the second PFPE in the surface layer, with respect to the total mass of the surface layer including the mass of the second PFPE in the pores.

Instrument: TGA851 (product name, by Mettler-Toledo International Inc.)
Atmosphere: air
Temperature: 425° C.

In a profile of measurement time-weight loss rate obtained as a result of the above thermogravimetric analysis, a linear least squares approximation expression was worked out from the region at which the slope was constant and only PFA decreased. The intercept of the linear least squares approximation expression was taken as the PFA content (mass %), and the second PFPE content was calculated as second PFPE content (mass %)=100-PFA content.

Evaluation as a Fixing Belt

The obtained fixing belt was subjected to the following Evaluations B-1 to B-4.

Evaluation B-1: Measurement of the Degree of Orientation A of the Surface Layer of the Fixing Belt Herein only the PFA tube containing the second PFPE was taken out from the fixing belt, in accordance with the same method as in Evaluation A-1 above. This PFA tube was cut open in the direction along the MD, to obtain a sheet-shaped analysis sample. The analysis sample was analyzed in accordance with the θ-2θ method using an X-ray diffractometer (XRD).

Specifically, firstly a rotating sample stage was attached to an X-ray diffractometer (product name: RINT 2500; by Rigaku Corporation). Next, a sample attachment to which the analysis sample was attached was set on the rotating sample stage. Measurement conditions were as follows.

Device: RINT 2500 (product name, by Rigaku Corporation)
X-ray source: CuKα
Detector: scintillation counter
Attachment: rotating sample stage
Voltage: 40 kV
Current: 15 mA
Slit conditions: DS (diverging slit=0.625°), SS (scatter slit)=1.25 degrees, RS (light-receiving slit)=0.3 mm
Measurement mode: β rotation, 2θ fixed (2θ=18°), θ fixed (transmission method)

The degree of orientation was measured over 360 degrees from 0 degrees up to 360 degrees of in-plane rotation (β rotation) of the measurement sample. Further, the sample was set so that the starting point (0 degrees) of β rotation matched the TD (Transverse Direction) measurement direction of the surface layer. By doing so, diffraction peaks derived from PFA molecules of the measurement sample oriented to the MD appear at β rotation angles of 90° and 270°.

A diffraction chart was obtained (see FIG. 6) that depicted the intensities of diffraction peaks for respective angles of β rotation obtained through β rotation of the analysis sample. In the diffraction chart, the degree of orientation A (%) denoting the degree of orientation of PFA molecules in the MD was worked out in accordance with Expression (1) below on the basis of the half widths (W) of peaks having respective peak tops at β rotation angles of 90 degrees and of 270 degrees.

$$A=[(360-\Sigma W)/360]\times 100 (\%) \quad (1)$$

The half width W in FIG. 6 is defined as the peak width at the ½ position of the height h between a drawn base line, denoted the dotted line, and a respective peak top, for β rotation angles of 90° and 270°.

The evaluations below were carried out using the obtained fixing belt.

Evaluation B-2: Evaluation of Occurrence or Absence of Toner Offset

The fixing belt was attached to an electrophotographic image forming apparatus (product name: imageRUNNER-ADVANCE C5051; by Canon Inc.) in which the angle of a paper separation claw had been adjusted.

An image forming process was carried out then of forming a 10 cm×10 cm cyan solid image on A4-size paper (by International Paper Co., Ltd., basis weight 75 g/m$^2$). The fixing temperature was set to 180° C., and the paper transport speed was set to 300 mm/sec.

Once the numbers of formed solid cyan images respectively reached 1 print, 300,000 prints, and 600,000 prints, one sheet A4-size plain thin paper (product name: CS-520, basis weight 52 g/m$^2$, by Canon Inc.) was run, to form a 10 cm×10 cm cyan solid image. The solid image formed on this plain thin paper was observed visually and under a microscope, and was evaluated according to the criteria below.

Evaluation Criteria

Rank A: neither toner offset nor missing toner.

Rank B: very slight toner offset and missing toner observed.

Rank C: Both toner offset and missing toner observed.

Rank D: plain thin paper became stuck to the fixing belt.

Evaluation B-3: Measurement of Surface Free Energy

In Evaluation 2, the surface free energy of the outer surface of the fixing belt immediately prior to the formation of a solid image on the respective plain thin paper was calculated in accordance with the "Kitazaki-Hata method" described in "Journal of the Japan Adhesive Society", Japan Society for Adhesion, 1972, Vol. 8, No. 3, pp. 131-141. Specifically, there were measured the contact angles of the outer surface of the fixing belt with water, n-hexadecane and diiodomethane (measurement environment: temperature 23° C., relative humidity 55%).

The surface free energy was then worked out, using the measurement results of each contact angle, on the basis of the "extended Fowkes equation" according to the "Kitazaki-Hata theory ("Journal of the Japan Adhesive Society", Japan Society for Adhesion, 1972, Vol. 8, No. 3, pp. 131-141)" set forth in the above literature.

A contact angle meter (product name: DM-501, by Kyowa Interface Science Co., Ltd.) was used for the measurement, and analysis software (product name: FAMAS, by Kyowa Interface Science Co., Ltd.) was utilized for analyzing the surface free energy.

Evaluation B-4: Evaluation of Abrasion Resistance of the Surface Layer Against Paper The fixing belt was fitted to an electrophotographic image forming apparatus (product name: imageRUNNER-ADVANCE C5051; by Canon Inc.).

An image forming process was then carried out to form a black grid-like image on A5-size paper (by International Paper Co., Ltd., basis weight 75 g/m$^2$, depth width 210 mm). The fixation temperature was set to 180° C., and the paper transport speed was set to 300 mm/sec.

Once the number of formed images respectively reached 100,000, 200,000 and 300,000 prints, one sheet of A4-size paper (by International Paper Co., Ltd., basis weight 75 g/m$^2$, depth width 294 mm) was run, to form a cyan solid image.

The solid image formed on this plain thin paper was observed visually and under a microscope, and the portions positioned at the ends of the A5-size paper were evaluated according to the criteria below.

Evaluation Criteria

Rank A: no toner offset at 300,000 or more prints

Rank B: very slight toner offset observed at 200,000 prints

Rank C: toner offset observed at 100,000 prints.

Rank D: toner offset observed at 100,000 or less prints

Toner offset in the present evaluation denotes the gradual occurrence of offset, during the paper passage process, in the form of stuck toner as the surface layer abrasions off at the ends of the A5 size paper and as scraping of the ends deepens. The toner fully adheres to the fixing belt side once the surface layer is completely scraped off.

Examples 2 to 9

Herein the degree of orientation A of the PFA tube used for forming the surface layer, the temperature at the time of contact with the first PFPE in the impregnation step-1, the type of the second PFPE used in the impregnation step-2, and the temperature at the time of contact with the second PFPE in the impregnation step-2 were modified as given in Table 1. Fixing belt Nos. 2 to 9 according to respective examples were produced in the same way as in Example 1, except for the above modifications.

Fixing belts were produced in the same way as in Example 1 except that in Examples 2, 6 to 9 the temperature at the time of melt extrusion of PFA for the prepared PFA tube having a degree of orientation A of 55% was set herein to 370° C.

Fixing belts were produced in the same way as in Example 1 except that in Examples 3 and 5 the temperature at the time of melt extrusion of PFA for the prepared PFA tube having a degree of orientation A of 75% was set herein to 390° C.

The physical characteristics (P1, P2, average opening diameter) of the PFA tubes having voids and obtained as a result of the impregnation step-1 and the removal step, as well as the content of the second PFPE in the surface layer resulting from introduction of second PFPE into the voids, and obtained in the impregnation step-2, were measured and calculated in accordance with the same methods as described for Evaluations A-1 to A-3 of Example 1. The results are given in Table 1.

Moreover, each of Fixing belts No. 2 to 9 was subjected to Evaluation B-1 to Evaluation B-4 set forth in Example 1. The evaluation results are given in Table 2.

Comparative Example 1

Fixing belt No. C-1 was obtained in the same way as in Example 9, but herein the temperature at the time of contact with the second PFPE in the impregnation step-2 was modified as given in Table 1. The content of the second PFPE in the surface layer of the obtained fixing belt No. C-1 was measured and calculated in accordance with the same method as described in Evaluation A-3 of Example 1. The results are given in Table 1. Table 2 sets out the evaluation results of Evaluation B-1 to Evaluation B-4 for Fixing belt No. C-1. In Fixing belt C-1 according to the present comparative example, introduction of the second PFPE into the voids in the impregnation step-2 was insufficient; as a result, the toner releasability of the first surface of the surface layer was observed to drop with time.

Comparative Example 2

The type of the first PFPE and temperature at the time of contact in the impregnation step-1 were set as given in Table 1. Except for those, the process up to the removal step of the first PFPE was carried out in the same manner as in Example 1, to produce a layered body in which the outer peripheral surface of the elastic layer was covered with a PFA tube having voids. This layered body was used as Fixing belt No. C-2 according to the present comparative example.

The content of the first PFPE in the first PFPE-containing PFA tube obtained as a result of impregnation step-1, and the physical characteristics (P1, P2, average opening diameter) of the PFA tube having voids and obtained as a result of the impregnation step-1 and the removal step, were measured and calculated in accordance with the same methods as described for Evaluations A-1 and A-2 set forth in Example 1. The results are given in Table 1.

Table 2 sets out the results of Evaluation B-1 to Evaluation B-4 for Fixing belt No. C-2. As shown in Table 2, the Fixing belt No. C-2 according to the present comparative example had a degree of orientation A of the surface layer of 0%. This can be conceivably ascribed to the loss of MD orientation of the PFA molecules in the PFA tube due to the fact that the temperature at the time of contact of the PFA tube and the first PFPE in the impregnation step-1 was 300° C., higher than the melting point of PFA-1. The PFA molecules in the surface layer of Fixing belt No. C-2 were not oriented in the MD, and accordingly the abrasion resistance of the first surface was poor. Moreover, the toner releasability of the first surface was poor from the beginning, since no second PFPE was introduced into the voids.

Comparative Example 3

The type of the first PFPE used in the impregnation step-1 and the temperature at the time of contact in the impregnation step-1 were as given in Table 1. Except for those, operations up to the impregnation step-1 were carried out in the same way as in Comparative example 2. The first PFPE adhered to the surface of the layered body obtained as a result of impregnation step-1 was wiped off using a nonwoven fabric. The layered body thus obtained was Fixing belt No. C-3 according to the present comparative example.

The content of the first PFPE in the first PFPE-containing PFA tube obtained in the impregnation step-1 was measured and calculated in accordance with the same method as described in Evaluation A-1 set forth in Example 1. The results are given in Table 1.

Voids could not be formed in the surface layer of Fixing belt No. C-3, even after the removal step of the first PFPE. This can conceivably be ascribed to the fact that the impregnation amount of the first PFPE into the PFA tube in the impregnation step-1 was insufficient to form aggregate portions of the first PFPE in the PFA tube.

Table 2 sets out the results of Evaluation B-1 to Evaluation B-4 for Fixing belt No. C-3. Similarly to Comparative example 2, the temperature at the time of contact in the impregnation step-1 was higher than the melting point of PFA-1, and accordingly the degree of orientation A of the PFA molecules in the surface layer was 0%. Further, the PFA molecules were not oriented in the MD, and accordingly the abrasion resistance of the first surface of the surface layer was poor. Further, the toner releasability of the first surface was observed to drop with time, since the amount of PFPE contained in the surface layer was small.

Comparative Example 4

A layered body was produced in the same way as in Comparative example 3, except that the PFA tube having a degree of orientation A of 55% used in Example 2 was utilized herein as the PFA tube, and the temperature at the time of contact in the impregnation step-1 was set as given in Table 1. This layered body was used as Fixing belt No. C-4 according to the present comparative example 4.

The content of the first PFPE in the first PFPE-containing PFA tube obtained in the impregnation step-1 was measured and calculated in accordance with the same method as described in Evaluation A-1 set forth in Example 1. The results are given in Table 1.

Similarly to the case of Fixing belt No. C-3, voids could not be formed in the surface layer of also Fixing belt No. C-4, even after the removal step of the first PFPE. This can conceivably be ascribed to the fact that the impregnation amount of the first PFPE into the PFA tube in the impregnation step-1 was insufficient for forming aggregate portions of first PFPE in the PFA tube.

Table 2 sets out the results of Evaluation B-1 to Evaluation B-4 for Fixing belt No. C-4. The temperature at the time of contact in the impregnation step-1 was lower than the melting point of PFA-1, and as a result the degree of orientation A of the PFA molecules in the surface layer, i.e. the degree of orientation A in the PFA tube, was maintained at 55%. The first surface of the surface layer exhibited therefore excellent abrasion resistance.

On the other hand, the content of PFPE in the surface layer was small, and as a result the toner releasability of the first surface was observed to drop with time.

Comparative Example 5

Herein a PFA tube having a degree of orientation A of 85% was produced in the same way as in Example 1, except that temperature at the time of melt extrusion of PFA was set to 400° C. Except that this PFA was used, fixing belt No. C-5 was produced in the same way as in Example 8.

The content of the first PFPE in the first PFPE-containing PFA tube obtained as a result of the impregnation step-1, and the physical characteristics (P1, P2, average opening diameter) of the PFA tubes having voids and obtained as a result of the impregnation step-1 and the removal step, as well as the content of the second PFPE in the surface layer of Fixing belt No. C-5, were measured and calculated in accordance with the same methods as described for Evaluations A-1 to A-3 set forth in Example 1. The results are given in Table 1.

Fixing belt No. C-5 was subjected to Evaluation B-1 to Evaluation B-4. The results of Evaluation B-1 revealed that the degree of orientation A of the surface layer of Fixing belt No. C-5 was 85%, identical to the degree of orientation A of the PFA tube. This can be arguably ascribed to the fact that the temperature at the time of contact between the PFA tube and the first PFPE in the impregnation step-1 is lower than the melting point of PFA-1, thanks to which there is maintained the MD orientation of the PFA molecules in the PFA tube.

In Evaluation B-2 and Evaluation B-3 tearing occurred along the MD in the surface layer before formation of 300,000 prints of a solid cyan image. Therefore, no evaluation after running of 300,000 prints was carried out. Evaluation B-4 as well was discontinued since the surface layer exhibited tearing in the MD during the evaluation test of abrasion resistance. The underlying reason herein is deemed to be the excessive strength of MD orientation of the PFA molecules within the surface layer.

Comparative Example 6

The outer peripheral surface of the elastic layer was coated with a stretched porous PTFE film (product name: Poreflon RP-010-30, by Sumitomo Electric Fine Polymer Inc.), instead of a cylindrically-extruded PFA tube. The physical characteristics (P1, P2 and average opening diameter) of this stretched porous PTFE film were measured and calculated in the same way as in the methods described in Evaluations A-1 and A-2 of Example 1.

This layered body was next subjected to the impregnation step-2, in the same way as in Example 8, to impregnate the voids of the stretched porous PTFE film with the second PFPE. In this way a layered body was achieved that had, as the surface layer, the obtained stretched porous PTFE film containing the second PFPE. This layered body was used as Fixing belt No. C-6 according to the present comparative example.

The content of the second PFPE in the surface layer containing the second PFPE was measured and calculated in accordance with the same method as described in Evaluation A-3 of Example 1. Fixing belt No. C-6 was subjected to Evaluation B-2 to Evaluation B-4. The results are given in Table 2.

TABLE 1

|  |  |  | PFA tube | | | | First PFPE (impregnation step -1) | | |
| --- | --- | --- | --- | --- | --- | --- | --- | --- | --- |
|  |  | PFA type | PFA melting point [° C.] | PFA thickness [μm] | Degree of orientation A | PFA type | Viscosity [mPa · s] | Temperature at the time of contact [° C.] | PFPE content [mass %] |
| Example | 1 No. 1 | PFA-1 | 296 | 20 | 35 | PFPE-1 | 54 | 280 | 25 |
|  | 2 No. 2 | PFA-1 | 296 | 20 | 55 | PFPE-1 | 54 | 280 | 25 |
|  | 3 No. 3 | PFA-1 | 296 | 20 | 75 | PFPE-1 | 54 | 280 | 25 |
|  | 4 No. 4 | PFA-1 | 296 | 20 | 35 | PFPE-1 | 54 | 290 | 30 |
|  | 5 No. 5 | PFA-1 | 296 | 20 | 75 | PFPE-1 | 54 | 290 | 30 |
|  | 6 No. 6 | PFA-1 | 296 | 20 | 55 | PFPE-1 | 54 | 280 | 25 |
|  | 7 No. 7 | PFA-1 | 296 | 20 | 55 | PFPE-1 | 54 | 280 | 25 |
|  | 8 No. 8 | PFA-1 | 296 | 20 | 55 | PFPE-1 | 54 | 280 | 25 |
|  | 9 No. 9 | PFA-1 | 296 | 20 | 55 | PFPE-1 | 54 | 280 | 25 |
| Comparative Example | 1 No. C-1 | PFA-1 | 296 | 20 | 55 | PFPE-1 | 54 | 280 | 25 |
|  | 2 No. C-2 | PFA-1 | 296 | 20 | 75 | PFPE-2 | 111 | 300 | 29 |
|  | 3 No. C-3 | PFA-1 | 296 | 20 | 75 | PFPE-6 | 459 | 300 | 18 |
|  | 4 No. C-4 | PFA-1 | 296 | 20 | 55 | PFPE-6 | 459 | 290 | 10 |
|  | 5 No. C-5 | PFA-1 | 296 | 20 | 85 | PFPE-1 | 54 | 280 | 25 |
|  | 6 No. C-6 | Porous PTFE | — | — | — | — | — | — | — |

|  |  | Pore physical characteristics | | | | Second PFPE (impregnation step -2) | | | |
| --- | --- | --- | --- | --- | --- | --- | --- | --- | --- |
|  |  | P1 [%] | P2 [%] | P2/P1 | Average opening diameter [nm] | Material type | Viscosity [mPa · s] | Temperature at the time of contact [° C.] | PFPE content [mass %] |
| Example | 1 No. 1 | 4.3 | 28 | 6.5 | 81 | PFPE-3 | 1403 | 200 | 25 |
|  | 2 No. 2 | 4.3 | 28 | 6.5 | 81 | PFPE-3 | 1403 | 200 | 25 |
|  | 3 No. 3 | 4.3 | 28 | 6.5 | 81 | PFPE-3 | 1403 | 200 | 25 |
|  | 4 No. 4 | 3.9 | 29 | 7.4 | 95 | PFPE-3 | 1403 | 200 | 30 |
|  | 5 No. 5 | 3.9 | 29 | 7.4 | 95 | PFPE-3 | 1403 | 200 | 30 |
|  | 6 No. 6 | 4.3 | 28 | 6.5 | 81 | PFPE-4 | 1941 | 200 | 25 |
|  | 7 No. 7 | 4.3 | 28 | 6.5 | 81 | PFPE-5 | 1327 | 200 | 25 |
|  | 8 No. 8 | 4.3 | 28 | 6.5 | 81 | PFPE-6 | 459 | 200 | 25 |
|  | 9 No. 9 | 4.3 | 28 | 6.5 | 81 | PFPE-6 | 459 | 150 | 20 |
| Comparative Example | 1 No. C-1 | 4.3 | 28 | 6.5 | 81 | PFPE-6 | 459 | 100 | 15 |
|  | 2 No. C-2 | 3.9 | 30 | 7.7 | 78 | — | — | — | — |
|  | 3 No. C-3 | — | — | — | — | — | — | — | — |
|  | 4 No. C-4 | — | — | — | — | — | — | — | — |
|  | 5 No. C-5 | 4.3 | 28 | 6.5 | 81 | PFPE-6 | 459 | 200 | 25 |
|  | 6 No. C-6 | 49 | 53 | 1.1 | 100 | PFPE-6 | 459 | 200 | 25 |

Table 2 sets out the evaluation results of the fixing belts produced in Examples 1 to 9 and Comparative examples 1 to 6.

TABLE 2

| | Evaluation B-1 Degree of orientation A of surface layer of fixing belt | Evaluation B-2 Toner offset | | | Evaluation B-3 Surface free energy | | | Evaluation B-4 Abrasion resistance evaluation rank |
|---|---|---|---|---|---|---|---|---|
| | | 1 print | 300,000 prints | 600,000 prints | Before paper passage | 300,000 prints | 600,000 prints | |
| Example 1 | 35 | A | A | A | 13.8 | 13.9 | 14.2 | A |
| Example 2 | 55 | A | A | A | 13.8 | 13.9 | 14.2 | A |
| Example 3 | 75 | A | A | A | 13.8 | 13.9 | 14.2 | A |
| Example 4 | 35 | A | A | A | 13.8 | 13.9 | 14.2 | A |
| Example 5 | 75 | A | A | A | 13.8 | 13.9 | 14.2 | A |
| Example 6 | 55 | A | A | A | 13.8 | 13.9 | 14.2 | A |
| Example 7 | 55 | A | A | A | 13.8 | 13.9 | 14.2 | A |
| Example 8 | 55 | A | A | A | 13.8 | 13.9 | 14.2 | A |
| Example 9 | 55 | A | A | A | 13.8 | 13.9 | 14.2 | A |
| Comparative Example 1 | 55 | A | D | D | 13.8 | 17.7 | 18.1 | A |
| Comparative Example 2 | 0 | D | D | D | 17.5 | 17.3 | 17.6 | D |
| Comparative Example 3 | 0 | A | B | D | 13.9 | 14.6 | 17.5 | D |
| Comparative Example 4 | 55 | A | B | D | 13.9 | 14.6 | 17.5 | A |
| Comparative Example 5 | 85 | A | — | — | 13.9 | — | — | * |
| Comparative Example 6 | — | A | D | D | 13.9 | 14.6 | 17.5 | D |

* Tearing occurred in the MD of the surface layer during the abrasion resistance test While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-217922 filed Dec. 25, 2020, and Japanese Patent Application No. 2021-186416 filed Nov. 16, 2021, which are hereby incorporated by reference herein in their entirety.

What is claimed is:

1. A fixing rotating member comprising a base layer, an elastic layer and a surface layer, in this order,
    the surface layer containing a tetrafluoroethylene-perfluoroalkyl vinyl ether copolymer and a perfluoropolyether,
    the surface layer having pores with openings at a first surface thereof, and constituting an outer surface of the fixing rotating member, and
    at least part of the pores containing the perfluoropolyether,
    wherein a content of the perfluoropolyether in the surface layer is 20 to 60 mass %, and
    a degree of orientation A of molecules of the tetrafluoroethylene-perfluoroalkyl vinyl ether in a direction perpendicular to a circumferential direction of the surface layer is 35 to 75%.

2. The fixing rotating member according to claim 1, wherein:
    when a first observation region 8 μm long×11 μm wide is placed on the first surface of the surface layer after removing the perfluoropolyether in the pores, and a ratio of a total sum of areas of the openings observed in the first observation region relative to an area of the first observation region is defined as P1; and
    when a second observation region 8 μm long×11 μm wide is placed in a cross section of the surface layer after removing the perfluoropolyether in the pores, the cross section including an entire thickness portion of the surface layer along a circumferential direction of the fixing rotating member, and a ratio of a total sum of areas of the pores observed in the second observation region relative to an area of the second observation region is defined as P2,
    P2/P1 is 1.3 or higher.

3. The fixing rotating member according to claim 2, wherein P2/P1 is 5.0 or higher.

4. The fixing rotating member according to claim 2, wherein P2/P1 is 20.0 or lower.

5. The fixing rotating member according to claim 1, wherein an average opening diameter of the openings in the outer surface is 1 nm to 5 μm.

6. The fixing rotating member according to claim 1, wherein a thickness of the surface layer is 12 to 100 μm.

7. The fixing rotating member according to claim 1, wherein the perfluoropolyether has a structure represented by formula (1):

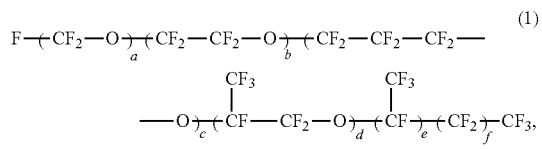

wherein in the formula (1), a, b, c, d, e and f are each independently 0 or a positive integer, satisfy 1≤a+b+ c+d+e+f≤600, and at least one from among a, b, c and d represents a positive integer.

8. The fixing rotating member according to claim 1, wherein the perfluoropolyether has at least one structure selected from the group consisting of formulae (2) to (5):

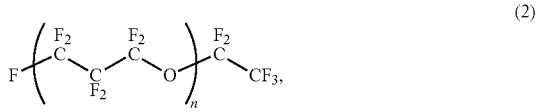

(2)

wherein in the formula (2), n is a positive number such that PFPE viscosity at a temperature of 40° C. is 30 to 500 mPa·s;

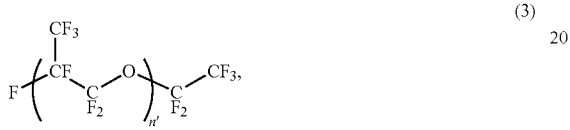

(3)

wherein in the formula (3), n' is a positive number such that PFPE viscosity at a temperature of 40° C. is 10 to 2500 mPa·s;

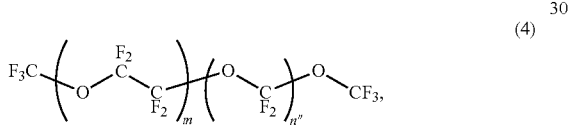

(4)

wherein in the formula (4), n" and m are each independently a positive number, m/n" is a number from 0.5 to 2, and n"+m is a number such that PFPE viscosity at a temperature of 40° C. is 20 to 1400 mPa·s; and

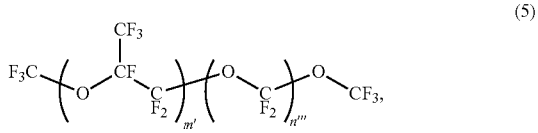

(5)

wherein in the formula (5), n'" and m' are each independently a positive number, m'/n'" is a number from 20 to 1000, and n'"+m' is a number such that PFPE viscosity at a temperature of 40° C. is 20 to 1200 mPa·s.

9. The fixing rotating member according to claim 1, wherein the fixing rotating member is a fixing belt having an endless belt shape.

10. A fixing apparatus, comprising a fixing rotating member, and heater for heating the fixing rotating member, wherein:
the fixing rotating member comprises a base layer, an elastic layer and a surface layer, in this order;
the surface layer contains a tetrafluoroethylene-perfluoroalkyl vinyl ether copolymer and a perfluoropolyether;
the surface layer has pores with openings at a first surface thereof, and constituting an outer surface of the fixing rotating member;
at least part of the pores contains the perfluoropolyether;
a content of the perfluoropolyether in the surface layer is 20 to 60 mass %; and
a degree of orientation A of molecules of the tetrafluoroethylene-perfluoroalkyl vinyl ether in a direction perpendicular to a circumferential direction of the surface layer is 35 to 75%.

11. The fixing apparatus according to claim 10, wherein:
the fixing rotating member is a fixing belt having an endless belt shape; and
the heater is disposed in contact with an inner peripheral surface of the fixing belt.

12. An electrophotographic image forming apparatus comprising the fixing apparatus according to claim 10.

13. A method for producing a fixing rotating member, wherein
the fixing rotating member comprises a base layer, an elastic layer, and a surface layer, in this order,
the surface layer contains a tetrafluoroethylene-perfluoroalkyl vinyl ether copolymer and a perfluoropolyether,
the surface layer has pores with openings at a first surface thereof, and constituting an outer surface of the fixing rotating member;
at least part of the pores contains the perfluoropolyether,
a content of the perfluoropolyether in the surface layer is 20 to 60 mass %, and
a degree of orientation A of molecules of the tetrafluoroethylene-perfluoroalkyl vinyl ether in a direction perpendicular to a circumferential direction of the surface layer being 35 to 75%,
the method comprises the steps of:
(i) providing a resin tube comprising a tetrafluoroethylene-perfluoroalkyl vinyl ether copolymer, wherein
a degree of orientation A of molecules of the tetrafluoroethylene-perfluoroalkyl vinyl ether copolymer is 35 to 75%;
(ii) providing a layered body comprising
a base layer having an endless belt shape or a roller shape,
an elastic layer on an outer peripheral surface of the base layer, and
the resin tube on an outer peripheral surface of the elastic layer;
(iii) immersing the layered body in a first perfluoropolyether at a temperature from 25° C. to below Tp, where Tp (° C.) is a melting point of the tetrafluoroethylene-perfluoroalkyl vinyl ether copolymer, to impregnate the resin tube with the perfluoropolyether;
(iv) removing, with a solvent, at least part of the perfluoropolyether within the resin tube of the layered body obtained in step (iii), to form, in the resin tube, pores with openings in an outer peripheral surface of the resin tube; and
(v) incorporating a second perfluoropolyether into at least part of the pores, to obtain a fixing rotating member having a surface layer comprising the second perfluoropolyether in at least part of the pores.

14. The method for producing a fixing rotating member according to claim 13, wherein viscosity of the first perfluoropolyether at a temperature of 40° C. is 10 to 350 mPa·s.

15. The method for producing a fixing rotating member according to claim 13, wherein the solvent is a solvent dissolving the first perfluoropolyether but not dissolving the tetrafluoroethylene-perfluoroalkyl vinyl ether copolymer.

16. The method for producing a fixing rotating member according to claim 13, wherein viscosity of the second perfluoropolyether at a temperature of 40° C. is 300 to 2500 mPa·s.

* * * * *